United States Patent [19]
Haselby

[11] Patent Number: 6,161,914
[45] Date of Patent: *Dec. 19, 2000

[54] ALIGNMENT SENSOR SYSTEM FOR MULTIPLE PRINT CARTRIDGES

[75] Inventor: Robert D. Haselby, San Diego, Calif.

[73] Assignee: Hewlett-Packard Company, Palo Alto, Calif.

[*] Notice: This patent is subject to a terminal disclaimer.

[21] Appl. No.: 08/885,337

[22] Filed: Jun. 30, 1997

Related U.S. Application Data

[63] Continuation of application No. 08/200,101, Feb. 22, 1994, Pat. No. 5,644,344, and a continuation of application No. 07/786,145, Oct. 31, 1991, Pat. No. 5,289,208.

[51] Int. Cl.$^7$ .......................... B41J 29/393; B41J 2/125
[52] U.S. Cl. .................. 347/19; 347/81; 395/105; 400/709
[58] Field of Search .................. 347/19, 81; 356/379, 356/380; 400/708, 709, 74; 395/103, 105

[56] References Cited

U.S. PATENT DOCUMENTS

| | | |
|---|---|---|
| 4,916,638 | 4/1990 | Haselby et al. ................... 347/132 X |
| 5,036,340 | 7/1991 | Osborne . |
| 5,049,898 | 9/1991 | Arthur et al. . |
| 5,109,239 | 4/1992 | Cobbs et al. . |
| 5,250,956 | 10/1993 | Haselby et al. ...................... 347/19 |
| 5,289,208 | 2/1994 | Haselby ............................... 347/19 |
| 5,297,017 | 3/1994 | Haselby et al. ...................... 347/19 |
| 5,644,344 | 7/1997 | Haselby ............................... 347/19 |

Primary Examiner—John Barlow
Assistant Examiner—C. Dickens

[57] ABSTRACT

Apparatus and techniques are disclosed for aligning the operation of the ink jet printhead cartridges of a multiple printhead ink jet swath printer that includes a print carriage that is movable along a horizontal carriage scan axis, (b) first and second ink jet printhead cartridges supported by the movable carriage for printing onto a print media that is selectively movable along a vertical media scan axis, and (c) an optical sensor supported by the movable carriage. The optical sensor includes a quad photodiode detector whose outputs are indicative of the horizontal positions of vertical test lines imaged on the detector in conjunction with horizontal alignment correction, as well as the vertical positions of horizontal test lines imaged on the detector in conjunction with vertical alignment correction.

15 Claims, 22 Drawing Sheets

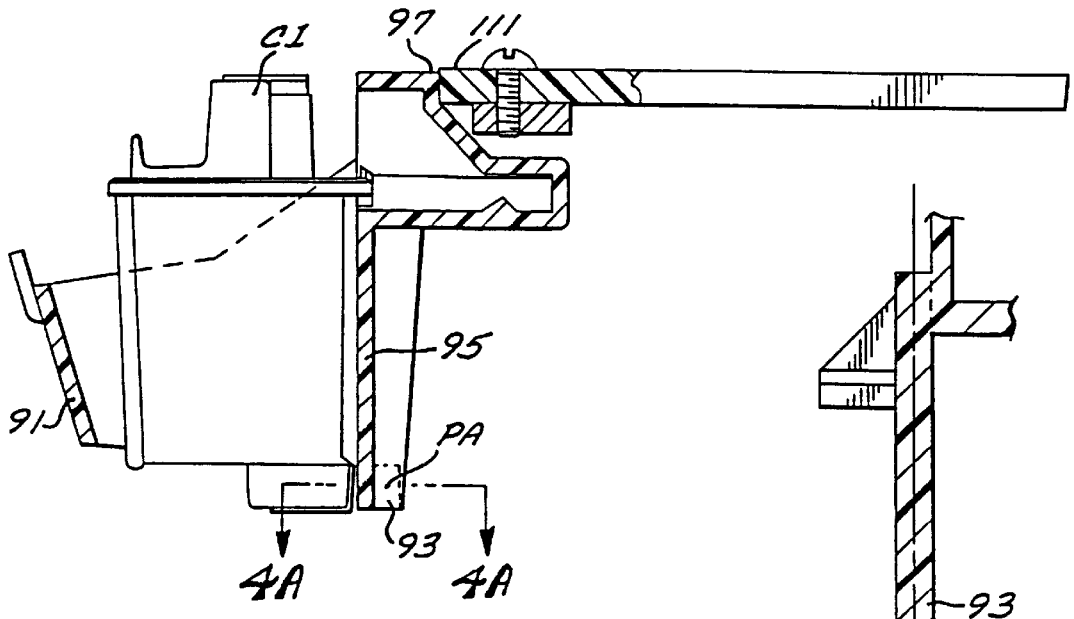
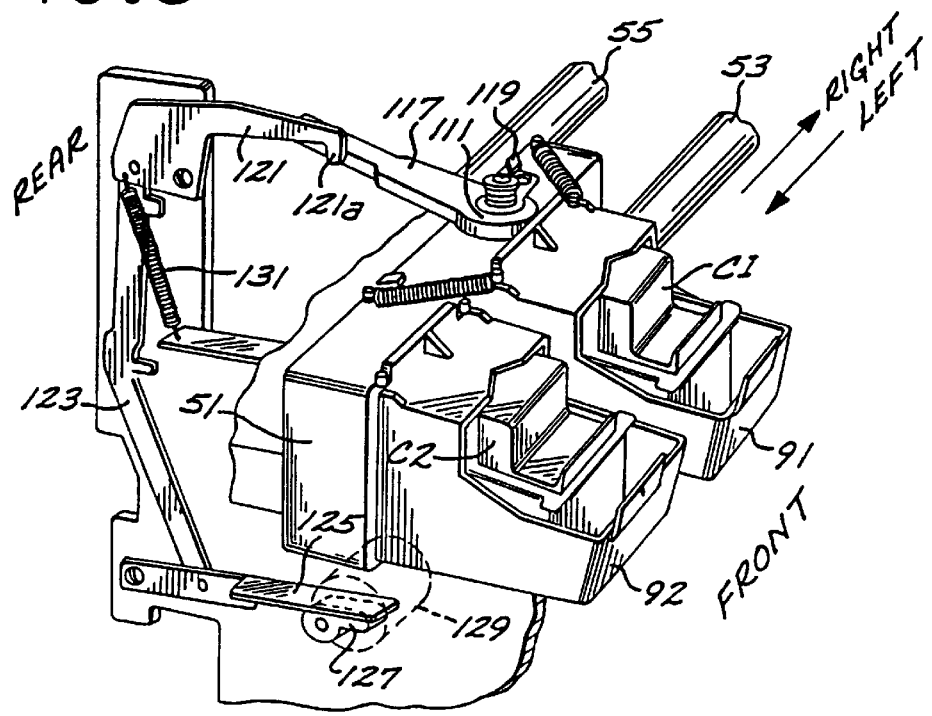

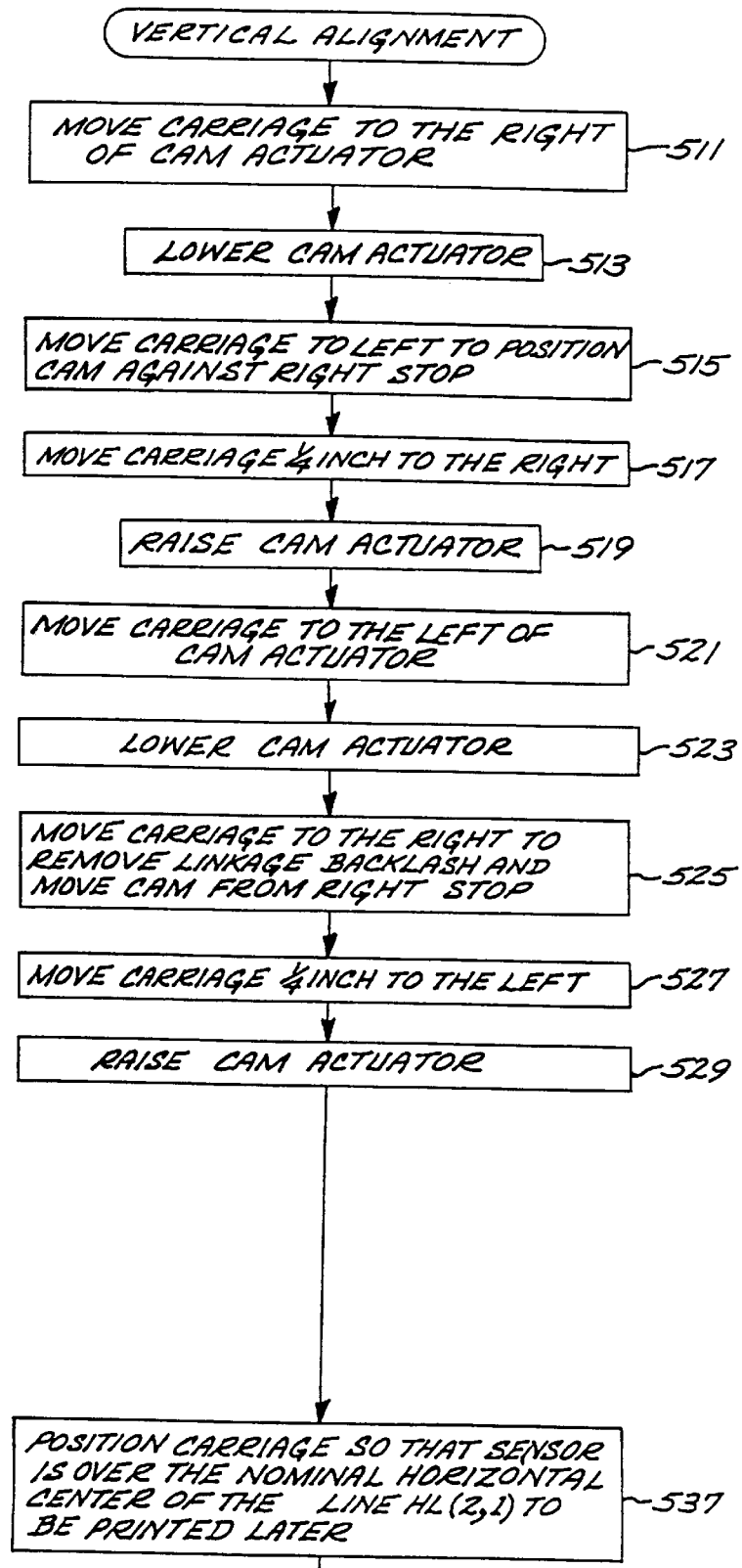
FIG. 17A

ALIGNMENT SENSOR SYSTEM FOR MULTIPLE PRINT CARTRIDGES

RELATED APPLICATIONS

This is a continuation of application Ser. No. 08/200,101, filed Feb. 22, 1994, now U.S. Pat. No. 5,644,344 in turn a continuation of application Ser. No. 07/786,145, filed Oct. 31, 1991, now U.S. Pat. No. 5,289,208.

BACKGROUND OF THE INVENTION

The subject invention is generally directed to swath type printers, and more particularly to apparatus arid techniques for vertical and horizontal alignment of the printheads of a multiple printhead swath type printer.

A swath printer is a raster or matrix type printer that is capable of printing a plurality of rows of dots in a single scan of a movable print carriage across the print media. The print carriage of a swath printer typically includes a plurality of printing elements (e.g., ink jet nozzles) displaced relative to each other in the media motion direction which allows printing of a plurality of rows of dots. Depending upon application, the separation between the printing elements in the media scan direction can correspond to the dot pitch for the desired resolution (e.g., $1/300$th of an inch for 300 dot per inch (dpi) resolution). After one swath or carriage scan, the media can be advanced by number of rows that the printer is capable of printing in one carriage scan or swath (i.e., the swath height or swath distance). Printing can be unidirectional or bidirectional.

The printing elements of a swath printer are commonly implemented in a printhead that includes an array of printing elements such as ink jet nozzles. Depending upon implementation, the printhead comprises a removable printhead cartridge such as those commonly utilized in ink jet printers. Throughput of a swath type ink jet printer can be increased by utilizing multiple ink jet printhead cartridges to increase the height of a swath by the additional printhead cartridges. A consideration with multiple printhead cartridge swath printers is print quality degradation as a result of printhead mechanical tolerances (e.g., the uncertainty of printhead cartridge to printhead cartridge positioning, and uncertainty of variations due to cartridge insertions), and drop velocity differences between printhead cartridges, where such degradation can occur in both bidirectional and unidirectional printing. Mechanical tolerances of the printhead to print media spacing also causes print quality degradation in bidirectional printing, with one or a plurality of printhead cartridges.

Factory compensation for each printer manufactured and/or tight manufacturing tolerance control would address some of the factors contributing to print quality degradation, but would be extremely difficult and expensive. Moreover, manufacturing tolerance control might not be able to address the effects on the printer of aging and temperature, particularly as to electronic components of the printer.

SUMMARY OF THE INVENTION

It would therefore be an advantage to provide methods and apparatus for detecting and compensating misalignments that affect print quality in a multiple printhead cartridge swath printer.

Another advantage would be to provide methods for automatically detecting and compensating misalignments that affect print quality in a multiple printhead cartridge swath printer.

In accordance with the invention, an optical sensor including a quad photodiode detector is utilized to determine the horizontal positions of printed vertical test lines which are imaged on the detector in conjunction with horizontal alignment correction, as well as the vertical positions of printed horizontal lines which are imaged on the detector in conjunction with vertical alignment correction.

BRIEF DESCRIPTION OF THE DRAWINGS

The advantages and features of the disclosed invention will readily be appreciated by persons skilled in the art from the following detailed description when read in conjunction with the drawing wherein:

FIG. 4 is a detail view of a positionally adjustable printhead cartridge retaining shoe of the swath printer of FIG. 1.

FIG. 5 is a detail view illustrating an example of a cam actuating mechanism for adjusting the position adjusting cam of the positionally adjustable printhead cartridge retaining shoe of FIG. 4.

FIGS. 17A through 17G set forth a flow diagram flow diagram of a procedure for vertically aligning the operation of the print cartridges of the swath printer of FIG. 1.

DETAILED DESCRIPTION OF THE DISCLOSURE

Figure 1:
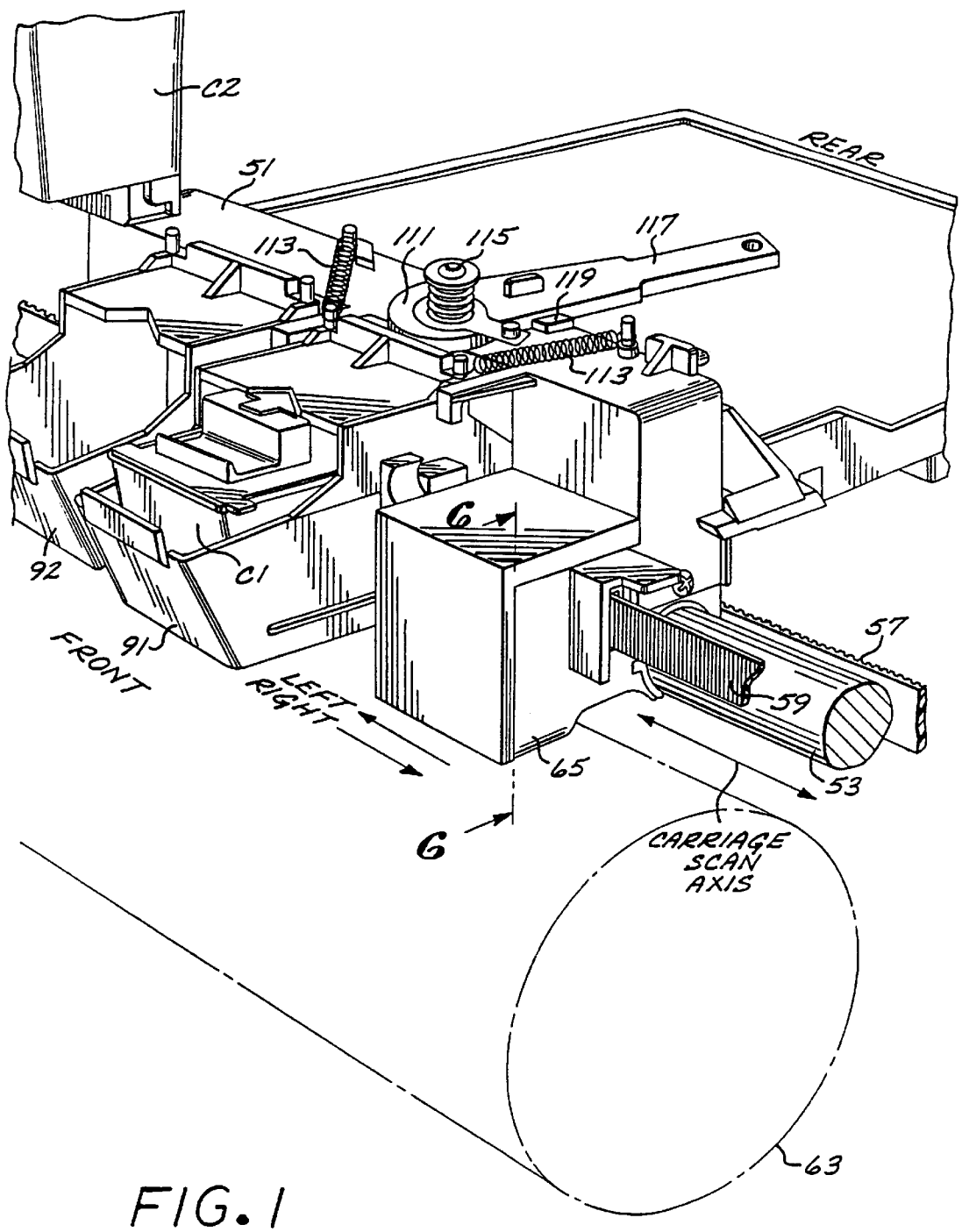
FIG. 1 is a schematic perspective view of the major mechanical components of a multiple printhead swath printer employing the disclosed apparatus and techniques for aligning the operation of the multiple printheads thereof.

In the following detailed description and in the several figures of the drawing, like elements are identified with like reference numerals.

Referring now to FIG. 1, set further therein is a schematic frontal quarter perspective view depicting, by way of illustrative example, major mechanical components of a swath type multiple printhead ink jet printer employing an alignment system in accordance with the invention for calibrating and correcting printhead misalignments, as viewed from in front of and to the right of the printer. The printer includes a movable carriage 51 mounted on guide rails 53, 55 for translational movement along the carriage scan axis (commonly called the Y-axis in the printer art). The carriage 51 is driven along the guide rails 53, 55 by an endless belt 57 which can be driven in a conventional manner, and a linear encoder strip 59 is utilized to detect position of the carriage 51 along the carriage scan axis,, for example in accordance with conventional techniques.

Figure 2:
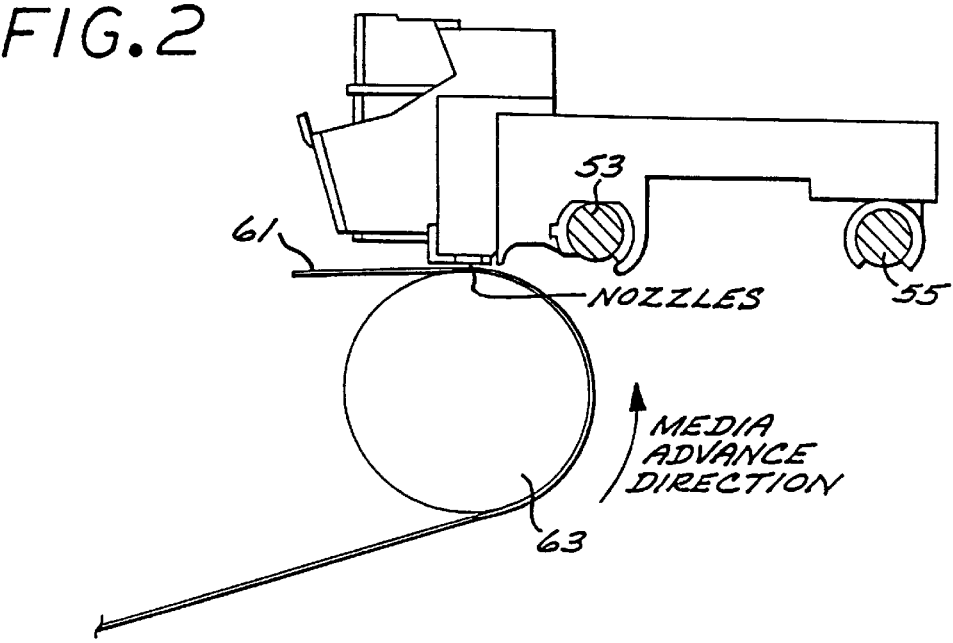
FIG. 2 is a schematic side elevational sectional view illustrating the relation between the downwardly facing ink jet nozzles and the print media of the printer of FIG. 1.

The carriage 51 supports first and second cartridge retaining shoes 91, 92 located at the front of the carriage for retaining substantially identical removable first and second ink jet printhead cartridges C1, C2 (sometimes called "pens," "print cartridges," or "cartridges"). FIG. 1 shows the cartridge C2 in a removed condition, while in FIG. 5 shows the cartridge C2 in its installed position. As depicted in FIG. 2, the printhead cartridges C1, C2 include downwardly facing nozzles for ejecting ink generally downwardly to a print media 61 which is supported on a print roller 63 that is generally below the printhead cartridges.

For reference, the print cartridges C1, C2 are considered to be on the front of the printer, as indicated by legends on FIG. 1, while left and right directions are as viewed while looking toward the print cartridges, as indicated by labelled arrows on FIG. 1. By way of example, the print media 61 is advanced while printing or positioning so as to pass from beneath the cartridge nozzles toward the front of the printer, as indicated on FIG. 2, and is rewound in the opposite direction.

Figure 3:
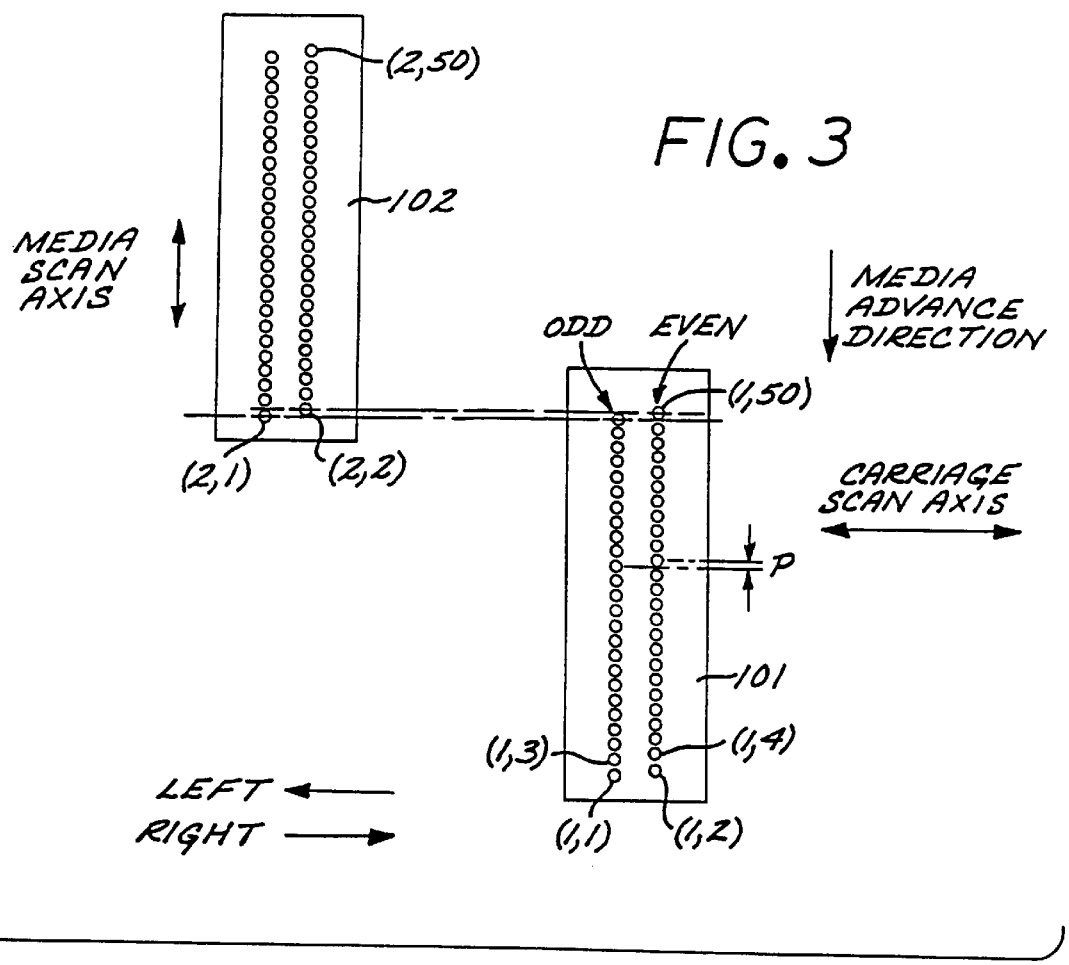
FIG. 3 is a schematic plan view illustrating the general arrangement of the nozzle arrays of the printhead cartridges of the printer of FIG. 1.

A media scan axis (commonly called the X-axis) as shown in FIG. 3 will be utilized as a reference for displacement of the media, as well as a reference for orientation of a line. The media scan axis can be considered as being generally tangential to the print media surface that is below the nozzles of the printhead cartridges and orthogonal to the carriage scan axis. In accordance with prior usage, the media scan axis is conveniently called the "vertical" axis, probably as a result of those printers having printing elements that printed on a portion of the print media that was vertical. Also in accordance with known usage, the carriage scan axis is conveniently called the "horizontal axis". From a practical viewpoint, if the printed output of the printer of FIG. 1 were placed vertically in front of an observer in the same orientation as it would hang down from the print roller 63, a line printed by with a single ink jet nozzle and media movement rather than carriage movement would be "vertical," while a line printed with a single ink jet nozzle and carriage movement rather than media movement. If the print media containing such lines were positioned horizontally in front of an observer, the line that extends away from the observer can be considered vertical by common convention; and the line that extends sideways as to the observer can be considered horizontal by common convention. Accordingly, in the following description, printed lines aligned with the media scan axis will be called "vertical" lines, and printed lines aligned with the carriage scan axis will be called horizontal lines.

FIG. 3 schematically depicts the arrangement of the nozzle plates 101, 102 of the first and second cartridges C1, C2 as viewed from above the nozzles of the cartridges (i.e., the print media would be below the plane of the figure). Each nozzle plate includes an even number of nozzles arranged in two columns wherein the nozzles of ore column are staggered relative to the nozzles of the other column. By way of illustrative example, each nozzle plate is shown as having 50 nozzles which are numbered as (a,1) through (a,50) starting at the lower end of the nozzle array with nozzles in the left column being the odd numbered nozzles and the nozzles in the right column being the even numbered nozzles, where "a" represents the printhead cartridge number. The distance along the media scan axis between diagonally adjacent nozzles, as indicated by the distance P in FIG. 3 is known as the nozzle pitch, and by way of example is equal to the resolution dot pitch of the desired dot resolution (e.g., $\frac{1}{300}$ inch for 300 dpi). In use, the physical spacing between the columns of nozzles in a printhead is compensated by appropriate data shifts in the swath print data so that the two columns function as a single column of nozzles.

The first and second cartridges C1, C2 are side by side along the carriage scan axis and are offset relative to each other along the media scan axis, and can be overlapped by as much as about 3 nozzle pitches along the media scan axis. As described more fully herein, 2 nozzles in each pen are logically disabled as selected pursuant to a test pattern in order to bring the enabled nozzles closer to proper operational alignment along the vertical axis.

The second retaining shoe 92 is fixedly secured to the carriage 51, while the first cartridge retaining shoe 91 is pivotally secured to the carriage 51 by a flexurally deformable, torsion bar like support member 93 located at the lower rear part of the retaining shoe 91 near the plane of the nozzle plate of the first printhead cartridge C1 and generally parallel to the carriage scan axis. By way of illustrative example, the torsion bar like support member 93 is integrally formed with a backplate 95 of the first cartridge retaining shoe 91 and with a portion of the carriage frame, such that the first retaining shoe 91 is pivotable about a pivot axis PA that passes through the torsion bar like support member 93. The top of the first cartridge retaining shoe 91 includes a cam follower flange 97 that is structurally integral with the back plate 95 of the retaining shoe. The cam follower flange 97 is biased rearwardly against a position adjustment cam 111 by a pair of retaining springs 113 which are connected between the top of the carriage and the top of the first retaining shoe.

The adjustment cam 111 is rotatably mounted on a pin 115 on the carriage 51 and is shaped so as to increase the distance between the cam pin 115 and the retaining shoe flange 97 with increased counterclockwise rotation of the cam, as viewed from above. The cam is rotated by a cam lever 117 that is integral with the cam, and is engageable with a right cam stop 119 which limits the clockwise rotation of the cam.

Thus, as the cam lever 117 is rotated counterclockwise away from the cam stop 119, the nozzle plate 101 of the first cartridge C1 is rotated downward about the pivot axis PA, which aims the nozzle plate of the first cartridge so that its print area is closer to the print area of the second cartridge along the media scan axis. Rotation of the adjustment cam 111 in the counterclockwise direction as viewed from above effectively positions the first print cartridge C1 closer to the second print cartridge C2.

The adjustment cam 111 is controllably moved pursuant to movement of the carriage 51 while the cam lever 117 is engaged against the downwardly extending tab 121a of a conveniently located pivoted adjustment lever arm 121 that can be pivoted so that the tab 121a is in or above the path of the cam lever 117 as the cam lever 117 moves with the carriage 51. As shown in FIG. 5, the cam actuator arm 121 can be in the proximity of one end of the carriage guide rails, and is actuated by an actuating lever 123 that is driven by a cam follower 125 which in turn is controlled by a cam 127 on the output of a stepper motor 129. A bias spring 131 ensures that the cam actuator arm 121 is fully raised when actuated to be in the raised position.

It should be appreciated that the cam actuator arm 121 can be controlled by other mechanisms, and that the stepper motor 129 can be used of additional purposes. The use of an actuator arm 121 and carriage displacement relative to the actuator arm 121 for cam adjustment avoids the use a separate servo motor for cam adjustment.

For ease of discussion relative to figures depicting printed lines, the media scan direction will also be called the vertical direction and the carriage scan direction will also be called the horizontal direction. Also Thus, the carriage moves to the left when it moves toward the cam actuator mechanism, and it moves the right when it moves away from the cam actuator mechanism. FIGS. 1, 3 and 5 generally include indications of the left and right directions.

As to swath advance, since the print media 61 enters beneath the print roller and is on top of the print roller when printed, the material first printed is closest to the bottom of the printed image as it hangs down from the print roller. Accordingly, printed subject matter depicted in the drawings will generally be regarded as having been printed from the bottom up, such that the bottom swath will have been printed first.

An optical sensor 65 is mounted on the carriage 51, for example to the right of and adjacent the first printhead cartridge retaining shoe 91. As discussed further herein, the optical sensor 65 is utilized to provide position data as to test lines printed on the print media 61 which is processed to compensate for horizontal and vertical misalignments between the first and second printhead cartridges C1, C2.

Figure 6:
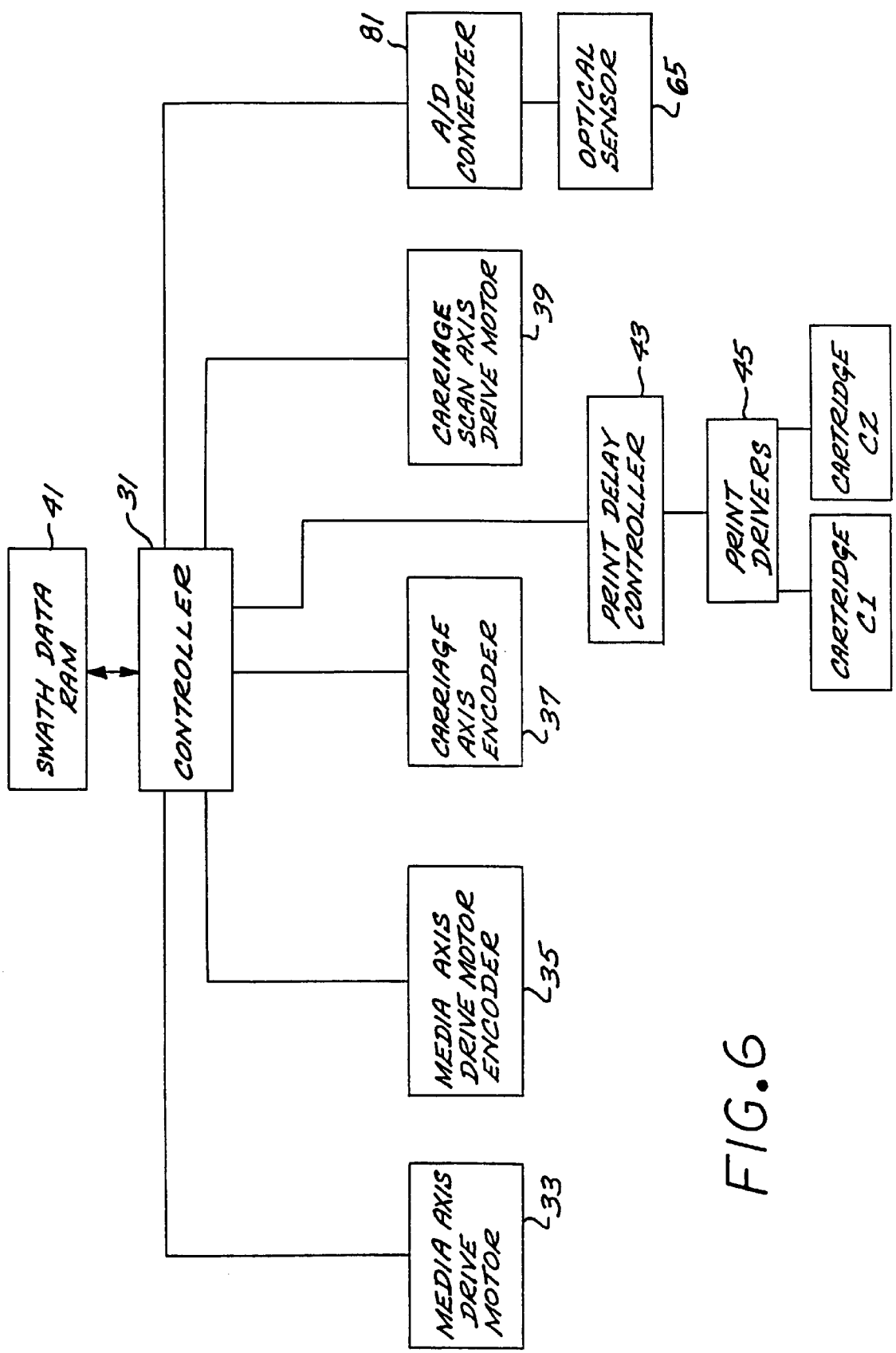
FIG. 6 is a simplified block diagram of a printer controller for controlling the swath printer of FIG. 1.

The movement of the carriage 51, the movement of the print media 61, the operation of the printhead cartridges C1 and C2, and the adjustment of the position of the first printhead cartridge C1 are controlled by a printer control system as shown in FIG. 6. The control system includes main controller 31 which controls the actions of the elements in the control system. A media axis drive motor encoder 35 provides information for the feedback control of a media axis driver motor 33 which moves the print roller 63 pursuant to media motion commands from the controller 31. Similarly, a carriage axis encoder 39 provides feedback information for the feedback control of a carriage scan axis drive motor 33 which positions the carriage 51 pursuant to carriage motion commands from the controller 31. A multi-channel analog-to-digital (A/D) converter 81 receives analog signals based on the outputs of the optical sensor 65 and provides digital versions of such analog signals for processing in accordance with the procedures described further herein. The controller further stores swath raster data into a swath data random access memory (RAM) 41, for example by converting input vector end points to raster data or by loading raster data directly from an appropriate source. The controller controls the transfer of swath raster data so as to map the ideal bit map in swath RAM to the media by selectively shifting the data in the horizontal sense so that appropriate data from the bitmap arrives at the print cartridge nozzles when the nozzles are over the appropriate region of the print media 61 as the carriage traverses in either carriage scan direction. This mapping will nominally contain appropriate shifts for each nozzle of each print cartridge to compensate for the two rows of nozzles on each print cartridge, and for the horizontal offset between print cartridges, where such shifts correspond to integral resolution dot pitches. As discussed further herein, nominal swath data shifts are adjusted or corrected to compensate for horizontal misalignments that are detected pursuant to the procedures described herein. The controller 31 also sets delays in the print delay controller 43 to compensate for horizontal alignment shifts that are less than one resolution dot pitch, in order to effect fine control of the final drop placement from the cartridges C1, C2. The print delay controller 43 controls print drivers 45 which provide ink firing pulses to the nozzles of the print cartridges C1, C2.

Swath data to media mapping and print cartridge timing delay corrections can be implemented, for example, with circuitry and techniques disclosed in commonly assigned co-pending application Ser. No. 07/786,326, filed concurrently herewith on Oct. 31, 1991, for "FAST FLEXIBLE PRINTER/PLOTTER WITH THETA-Z CORRECTION," by Chen, Corrigan, and Haselby now abandoned.

The print cartridges C1, C2 are mechanically closely aligned pursuant to manufacturing tolerances, and are finely aligned as disclosed herein so that the two printhead cartridges C1, C2 cooperatively function like a single printhead having a single column of 96 nozzles. In this manner, each scan or swath is 96 nozzle pitches wide (as measured in the media scan direction), and provides for an increased rate of printing as compared to the use of a single print cartridge. Alignment along the carriage scan axis is achieved by adjusting the swath data shifts to provide correction of the integral dot pitch portion of the detected horizontal misalignment, and then adjusting the timing of the firing of the ink jet nozzles to correct the fractional dot pitch portion of the detected horizontal misalignment. Alignment in the media scan direction is achieved by selecting the enabled nozzles of the printhead cartridges C1, C2 to correct the integral nozzle pitch portion of the detected vertical misalignment, and then adjusting the angular position of the first printhead cartridge C1 relative to the second printhead cartridge C2 via the adjustment cam 111 to correct the fractional nozzle pitch portion of the detected vertical misalignment. These adjustments are made pursuant to the printing of test line segments, and then measuring the distances between the test line segments by use of the optical sensor 65 which is shown in simplified schematic cross-section in FIG. 7.

Figure 7:
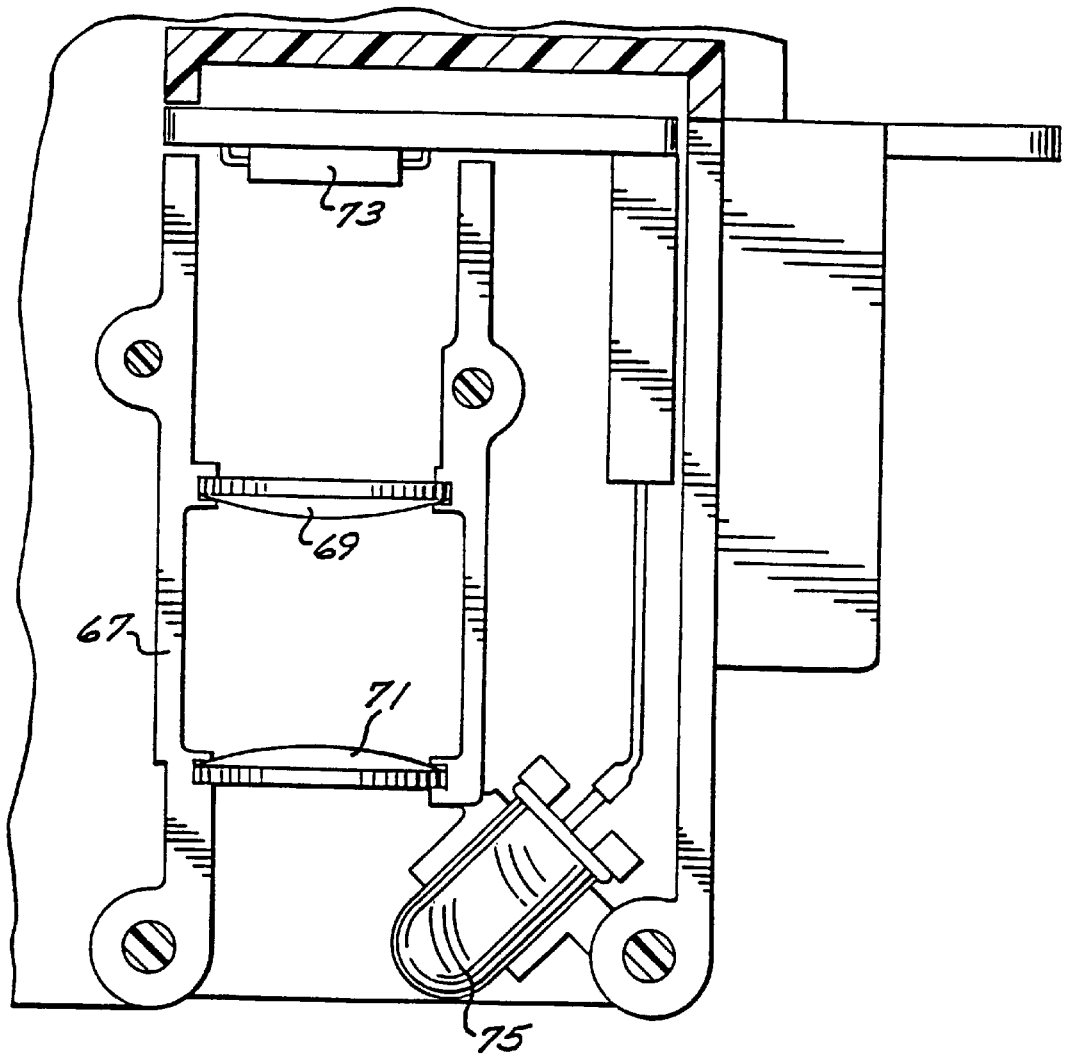
FIG. 7 is a simplified sectional view of the optical sensor of the swath printer of FIG. 1.

Referring particularly to FIG. 7, the optical sensor includes a housing 67 which supports imaging lenses 69, 71 that image a portion of the print media, for example on a one-to-one basis, onto a quad photodiode detector 73 located at the top of the housing. An illumination source 75, comprising for example an LED, is supported at the bottom of the housing so as to illuminate the print media that is in the vicinity of the optical axis of the imaging lenses 69, 71.

Figure 8:
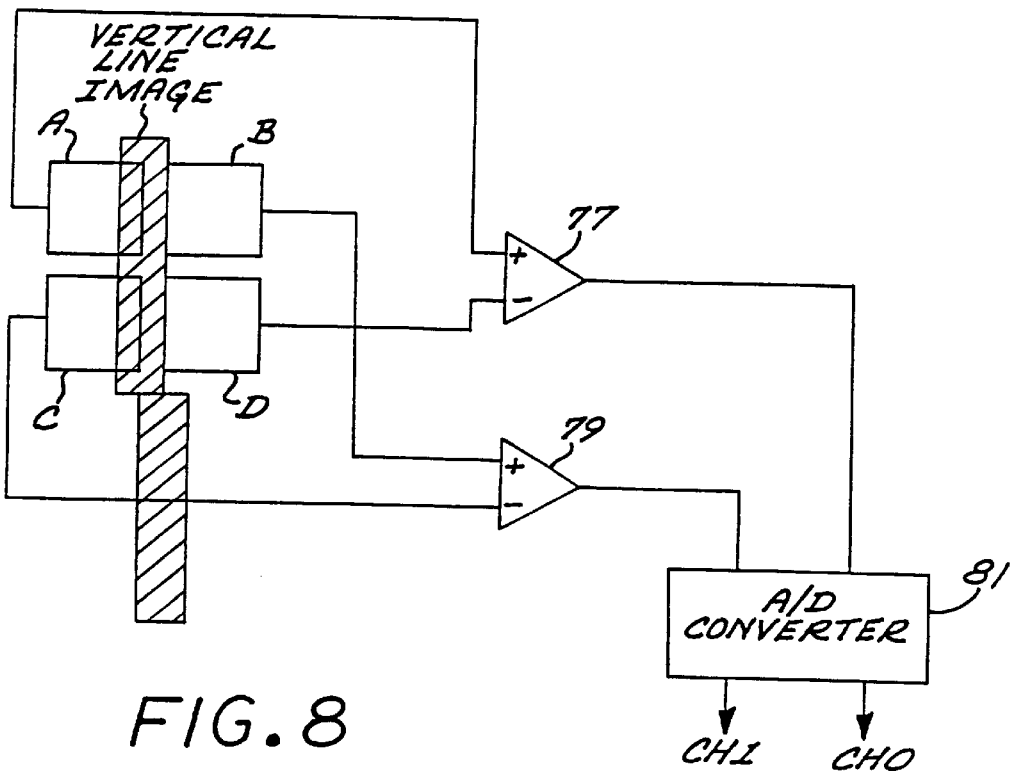
FIG. 8 is a schematic diagram of the quad photodiode detector of the optical sensor of FIG. 7 that depicts the active areas of the photodiodes of the quad detector as well as circuitry for processing the outputs of the quad sensor.

The quad photodiode detector 73 comprises four photodiodes A, B, C, D as schematically depicted in FIG. 8 which also illustrates in block form circuitry for processing the outputs of the detector photodiodes. The photodiodes A, B, C, D are depicted as boxes that represent their active areas. The active areas of the photodiodes A and B are aligned with the carriage scan axis as are the active areas of the photodiodes C and D. The active areas of the photodiodes A and C are aligned with the media axis, as are the active areas of the photodiodes B and D. Essentially, the photodiodes are positioned in a square whose sides are aligned with the carriage scan axis and the media scan axis.

A difference amplifier circuit 77 subtracts the output of the photodiode D from the output of the diagonally opposite photodiode A, while a difference amplifier circuit 79 subtracts the output of the photodiode C from the output of the diagonally opposite photodiode B. The analog difference outputs of the difference amplifier circuits 77, 79 are converted to digital by respective channels of the analog-to-digital converter 81, which for illustrative purposes are channels 0 and 1. Alternatively, individual A/D converters can be used for each of the difference outputs of the difference amplifier circuits 77, 79. Subtraction of the digital versions of the difference amplifier circuit outputs produces a difference signal H that is effectively the difference of the outputs of a dual detector wherein the vertically aligned photodiodes A and C function as one detector and the vertically aligned photodiodes B and D function as the other detector:

$$H=CH0-CH1=(A-D)-(B-C)=(A+C)-(B+D) \quad \text{(Equation 1)}$$

where the photodiode detector outputs are represented by the reference letters used to identify the photodiode detectors, and where the outputs of the A/D converter channels 0 and 1 are respectively represented as CH0 and CH1. The difference signal H shall be called the sensor horizontal difference signal H since it will be utilized to determine the horizontal positions of vertical lines.

Analogously, adding the digital versions of the outputs of the difference amplifier circuits 77, 79 produces a difference signal V that is effectively the difference of the outputs of a dual detector wherein the horizontally aligned photodiodes A and B function as one detector and the horizontally aligned photodiodes C and 1) function as the other detector:

$$V=CH0+CH1=(A-D)+(B-C)=(A+B)-(C+D) \quad \text{(Equation 2)}$$

The difference signal V shall be called the sensor vertical difference signal since it will be used to determine vertical position of horizontal lines.

Figure 9:
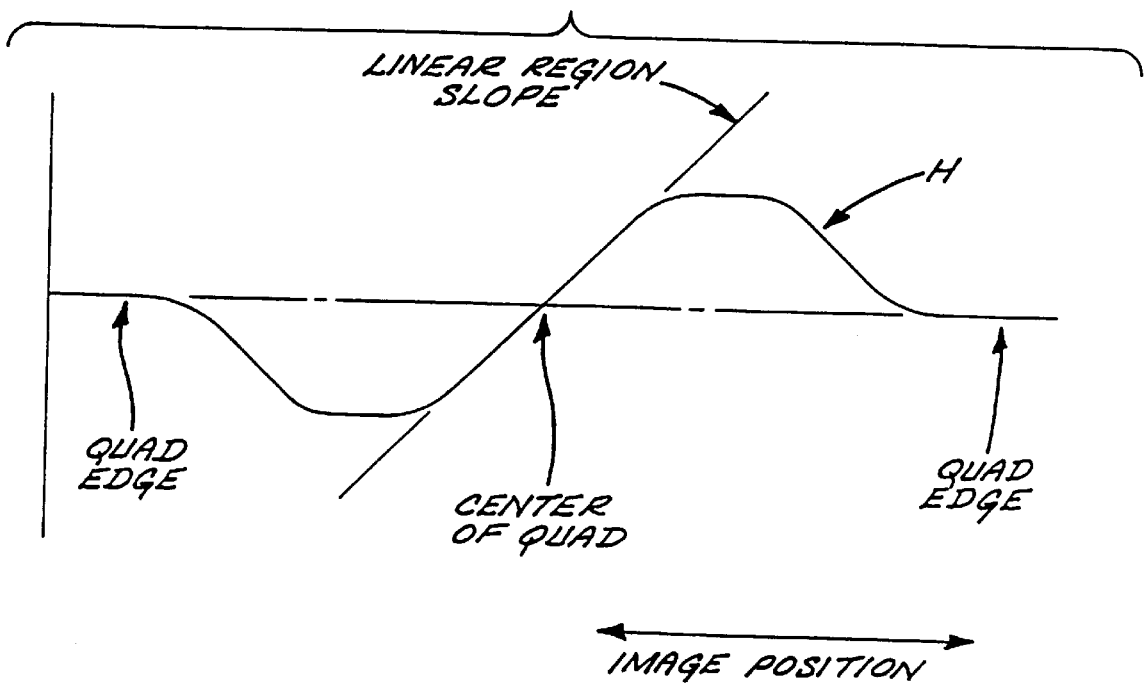
FIG. 9 is a continuous plot of the response of the quad detector and associated output circuitry as a function of displacement of the image of a vertical line across the active areas of the quad detector along an axis that is perpendicular to the length of the line.

FIG. 9 schematically illustrates a continuous plot of the sensor horizontal difference signal H as a function of displacement of the image of a vertical line across the active areas of the quad detector along the carriage scan axis. As the image begins to fall on the (A+C) side of the quad the difference signal H becomes negative since less photo current is developed in these segments. The difference signal H flattens out as the image is completely on the (A+C) side. The image then starts leaving the (A+C) side and entering the (B+D) side. The resulting difference signal H then becomes positive because more photo current is being generated by the (A+C) side and less is being generated by the (B+D) side. The slope of the center region of the plot of the difference signal H is ideally linear and is the "useful" region of the optical sensor. The flat positive flat portion of the plot corresponds to when the image of the line is only on the (B+D) side of the quad. Finally the difference signal H returns to the base line as the line image leaves the right side of the quad.

A continuous plot of the sensor vertical difference signal V as a function of displacement of the image of a horizontal line across the active areas of the quad detector along the media scan direction would be similar to that shown in FIG. 9, except that image position would be along the media scan axis. The center of the response of the difference signal V contains a useful linear region wherein the difference signal V can be utilized to sense the vertical position.

The field of view of the optical sensor must be less than the length of the line segment to be sensed, plus or minus the uncertainty of positioning accuracy along the line, so that the image of the line always extends beyond the active area of the quad sensor, for example as schematically illustrated in FIG. 8. In other words, the line segment must be extend in both directions beyond the field of view of the optical sensor. The range of the optical sensor linear region about the center of the quad detector depends upon magnification, the width of the line segment being imaged, and the width of the individual photodiode segments of the quad detector. By way of illustrative example, for a magnification of essentially one, horizontal line segments having a width of 3 resolution dot pitches for vertical position sensing, vertical line segments having a width of 5 resolution dot pitches for horizontal sensing, and quad photodiode elements larger than the widths of the lines to be imaged, the range of the linear sensor region is about 3 resolution dot pitches for vertical position sensing and about 5 resolution dot pitches for horizontal position sensing.

Horizontal alignment can be achieved generally as follows. The optical sensor 65 is initially calibrated to determine a best fit straight line for the center of the plot or response of the horizontal difference signal H for the particular sensor so that the horizontal difference signal H value for a detected vertical line segment can be translated into position relative to a predetermined horizontal reference location. A plurality of vertical test line segments are then printed by each of the cartridges in each of the carriage scan directions, and the horizontal positions of the vertical test line segments are determined relative to the predetermined reference location by horizontally positioning the optical sensor so that all of the vertical test line segments are horizontally within the linear region of the sensor. The media is then displaced so that the sensor is respectively vertically aligned with the nominal vertical centers of the test line segments, and the horizontal difference signal H values for each of the line segments is read and utilized to determined line position in accordance with the best fit straight line. The differences between relative horizontal positions of the vertical test line segments are then utilized to adjust swath print data column shifts and the timing of nozzle firing of the printhead cartridges.

Figure 10:
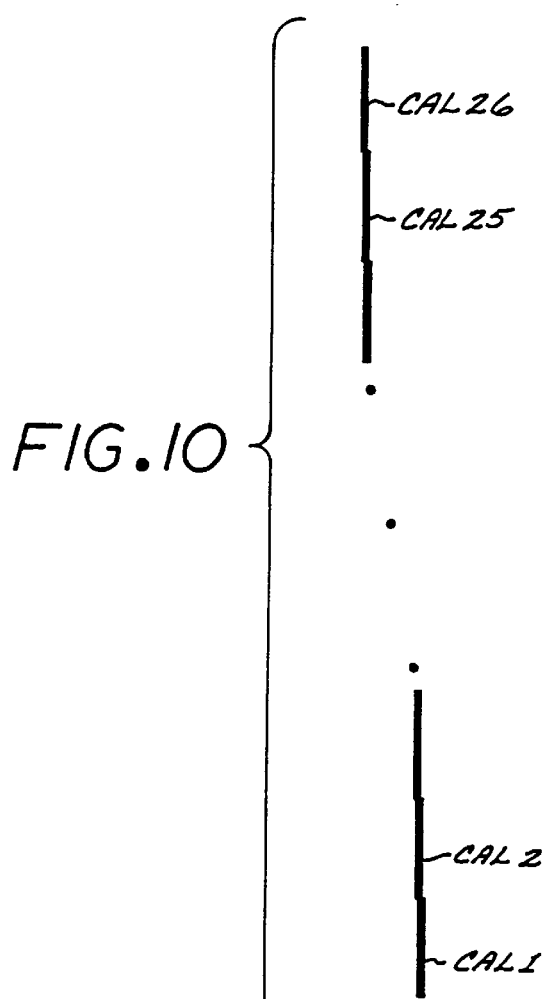
FIG. 10 illustrates in exaggerated form a series of printed offset vertical line segments which are utilized for calibration of the quad sensor outputs for determining horizontal position of vertical test line segments.
Figure 15A:
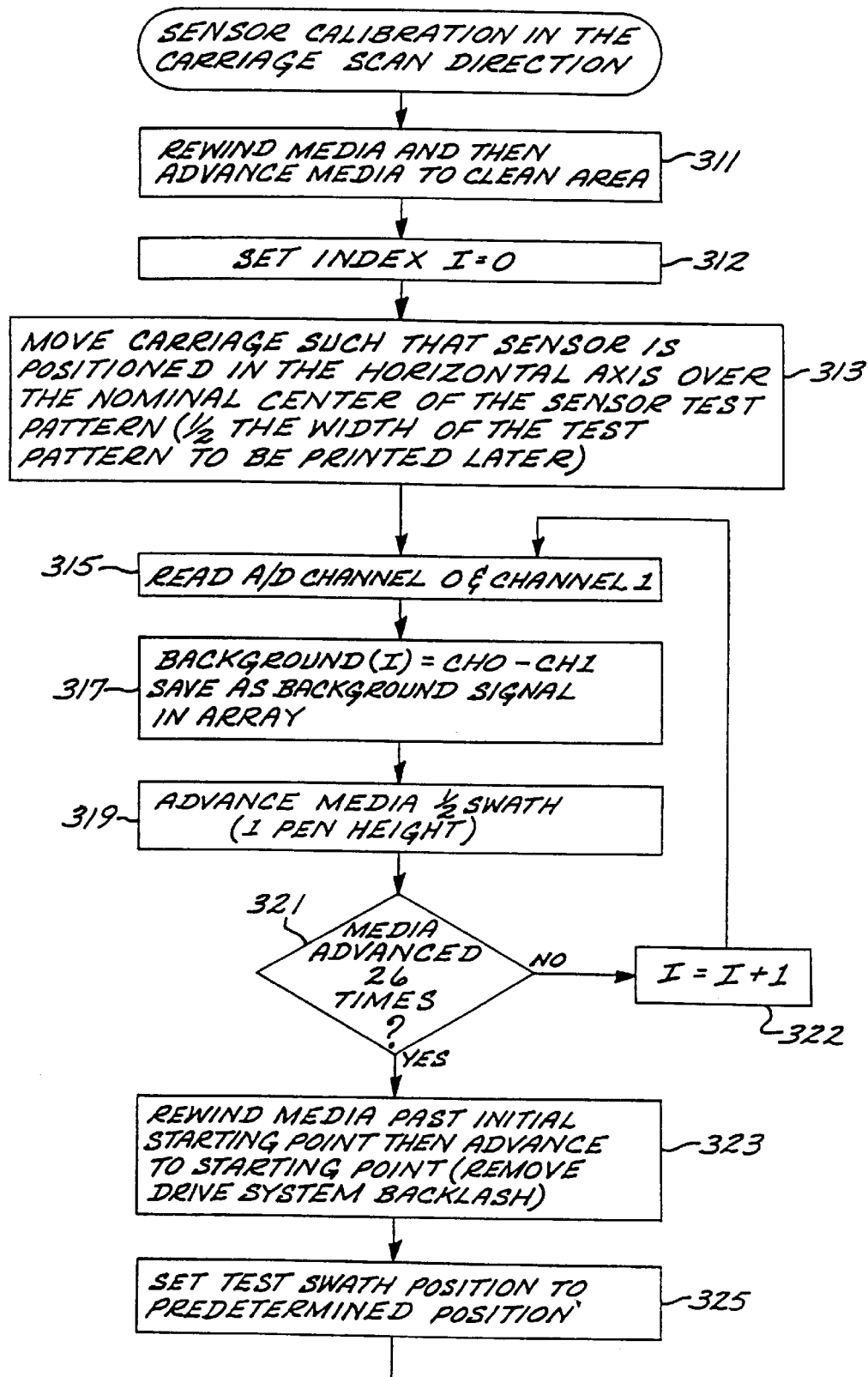
FIGS. 15A through 15C set forth a flow diagram of a procedure for calibrating the optical sensor of the printer of FIG. 1 for use in determining horizontal position of vertical test line segments.
Figure 15B:
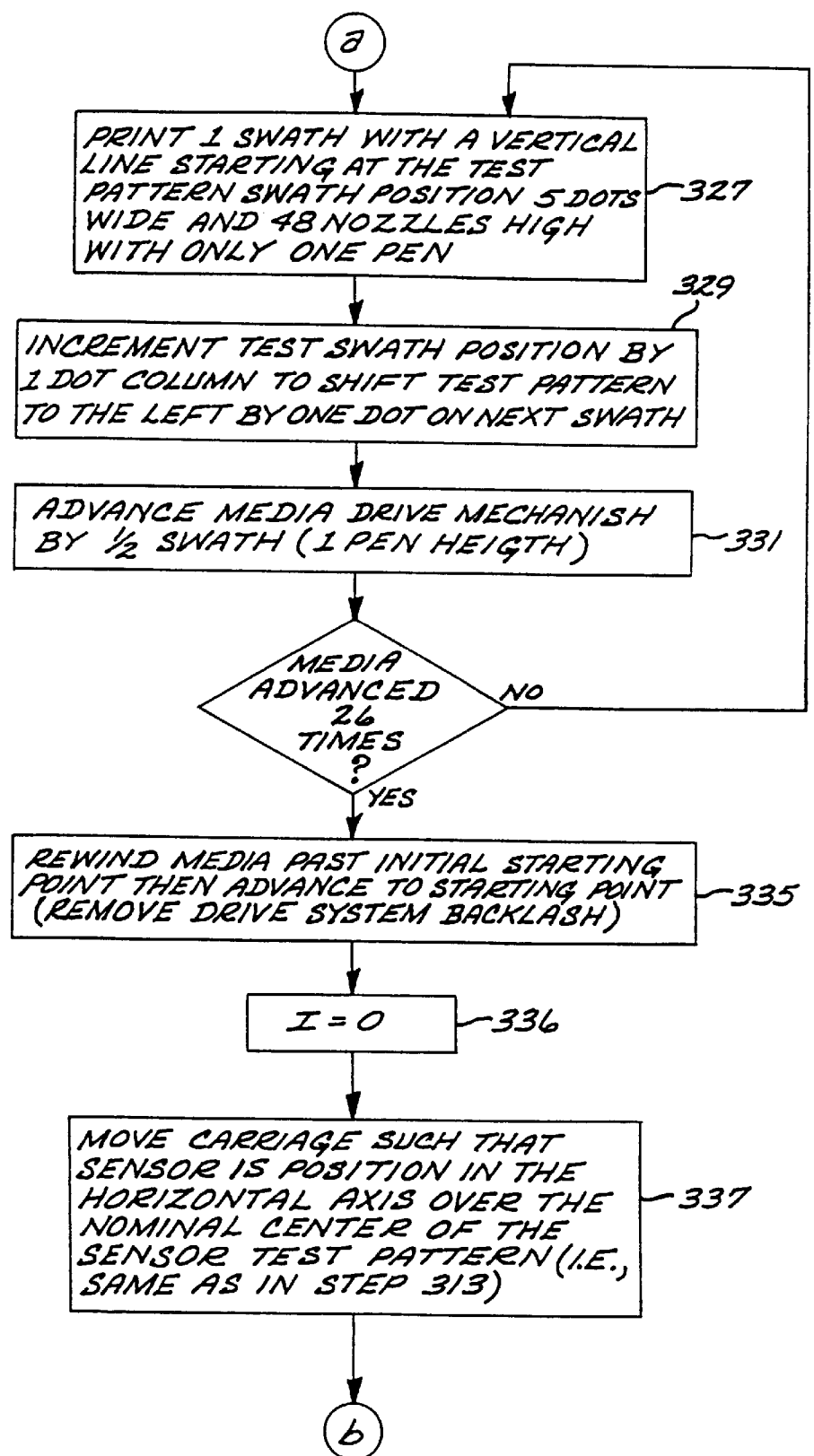
Figure 15C:
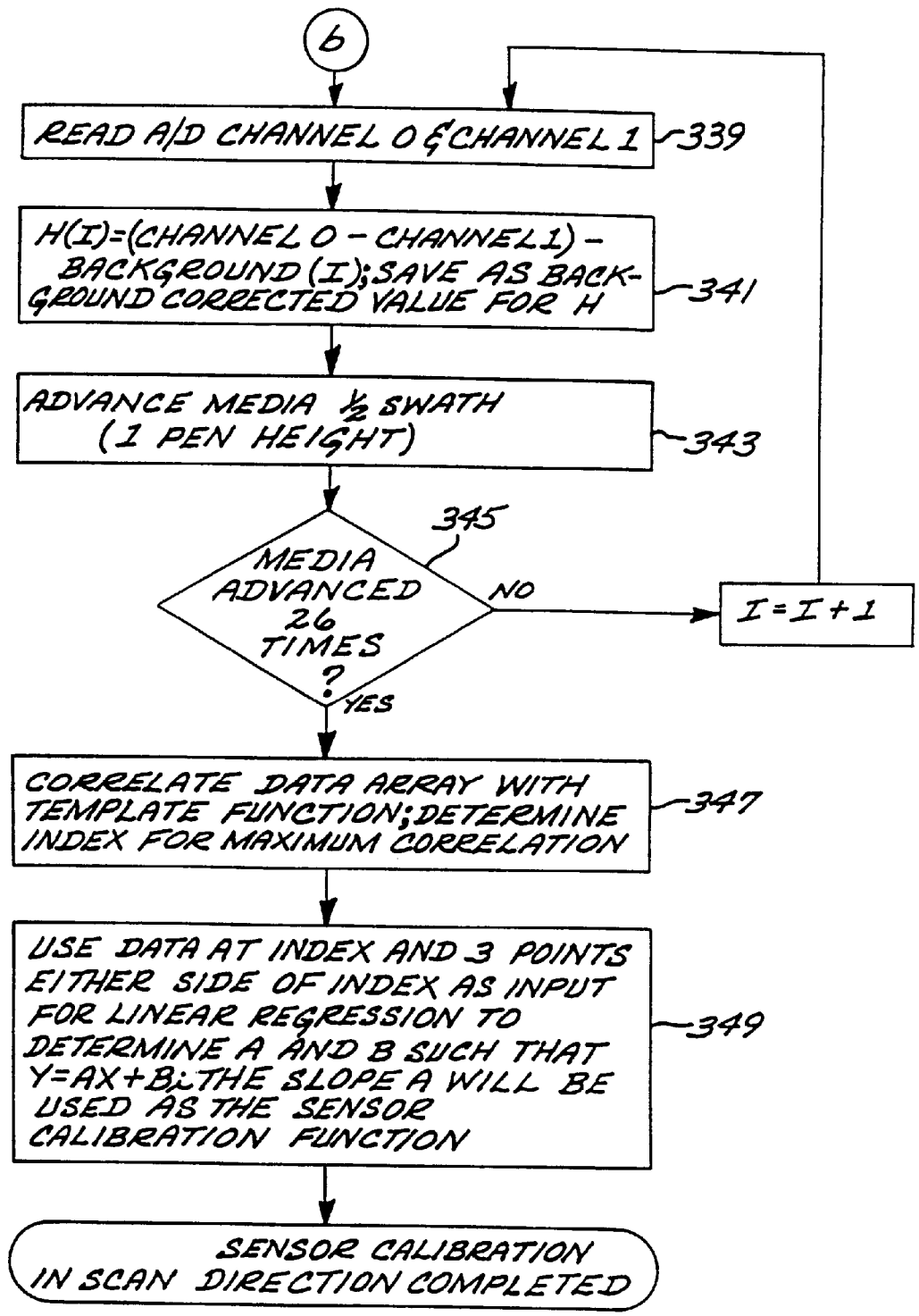

FIG. 10 illustrates in exaggerated form a slightly diagonal calibration "line" that is produced by one of the printheads in a unidirectional mode in conjunction with a calibration procedure set forth FIGS. 15A through 15C for calibrating sensor H difference signal response for horizontal alignment of the print cartridges.

Referring in particular to the flow diagram of FIGS. 15A through 15C, at 311 the print media is rewound and then advanced to a predetermined vertical start location of a clean unprinted area, so as to remove drive system backlash. At 313 the carriage is moved so as to align the optical sensor with the nominal horizontal center of the calibration line to be printed later (i.e., horizontally between the ends of calibration line), and at 315 the channel 0 and channel 1 outputs of the A/D converter 81 are read. At 317 the value of the sensor horizontal difference signal H is calculated in accordance with Equation 1, and the result is stored as a background value for the particular vertical location of the print media. At 319 the media is advanced one-half swath (i.e., 48 nozzle pitches along the media scan axis). At 321 a determination is made as to whether the media has been advanced by 26 half-swaths pursuant to step 319. If no, control transfers to 315 for the calculation and storage of another value of the H difference signal. If the determination at 321 is yes, control transfers to 323.

Pursuant to steps 313 through 321, background values of the horizontal difference signal H are determined for those locations which will be sensed by the optical sensor for sensing the vertical segments of the calibration line to be printed next.

At 323 the media is rewound past the predetermined vertical start location and then advanced to the predetermined vertical start location, so as to remove drive system backlash. At 325 the swath position for the first vertical segment CAL1 of the calibration line is set to a predetermined horizontal location corresponding to the horizontal start of the calibration line. At 327 the carriage is scanned in a predetermined direction, and a vertical line having a width of 5 resolution dot pitches is printed using 48 nozzles of a predetermined cartridge starting at the specified swath position. At 329 the specified swath position is incremented to offset the next vertical line segment one resolution dot pitch, for example to the left, and at 331 the media is advanced by one-half swath. At 333 a determination is made as to whether the media has been advanced 26 times pursuant to step 331. If no, control transfers to 327 to print another vertical segment of the calibration line.

Pursuant to steps 325 through 333, one printhead cartridge is caused to print in the same scan direction a series of vertical line segments CAL1 through CAL26 of substantially constant width, where the vertical line segments are respectively incrementally offset in a given horizontal direction by one resolution dot pitch.

At 335, the media is rewound past the predetermined vertical start location and then advanced to the vertical start position, so as to remove drive system backlash. At 337 the carriage 51 is moved so as to align the optical sensor 65 with the nominal horizontal center of the calibration line that was just printed in pursuant to steps 325 through 333 (i.e. in the same horizontal position as in step 313 above). At 339 the CH0 and CH1 outputs of the A/D converter are read. At 341 a background corrected value for the difference signal H is calculated by taking the difference between the CH0 and CH1 outputs, and subtracting the previously stored background value of H for the present vertical location. The background corrected value for H is stored as to the present vertical location, and at 343 the print media is advanced by one-half swath. At 345 a determination is made as to whether the media has been advance 26 times pursuant to step 343. If no, control transfers to 339 for sampling of further A/D CH0 and CH1 outputs. If yes, control transfers to 347.

Pursuant to steps 335 through 345, background corrected values of the difference signal H for vertical line segments of different horizontal positions are stored in an array, wherein position in the array represents horizontal distance from an undefined but fixed horizontal reference. Thus, if the 0th entry in the array is for the first vertical line, the horizontal positions of the vertical lines responsible for the array values can be considered equal to I resolution dot pitches from the 0 horizontal position which is defined by the first vertical line, where I corresponds to position in the array. As will be seen later, the array values are subtracted from each other for correction purposes, and the actual C horizontal location is not pertinent.

At 347 the stored background corrected values of the difference signal H are correlated with a template function that is similar to the linear region of the plot of FIG. 9 of the sensor difference signal H. The template function has fewer data points than the stored array of background corrected values of the difference signal H, and the array position of the difference signal H value at the center of the sequence of difference signal values that produces the maximum correlation is saved as the maximum correlation index. At 349 the background corrected value of the difference signal H corresponding to the maximum correlation index and the three background corrected values of the difference signal H on either side thereof are utilized for a linear regression that determines the best fit straight line:

$$H=A*HPOS+B \quad \text{(Equation 3)}$$

where H is the background corrected difference signal H, HPOS is horizontal image position relative to a fixed 0 horizontal location, A is the slope, B is the hypothetical value of H according to the best fit line for a vertical line located at the fixed 0 horizontal location. The slope A will be utilized later to determine the position of vertical test lines such as those schematically shown in FIG. 11.

The foregoing calibration procedure effectively scans the calibration line across the sensor in the horizontal direction without horizontally moving the optical sensor 65 and without having to rely upon the resolution of print carriage positioning mechanism of the printer. Thus, this calibration technique and the technique described further herein for determining horizontal position of vertical lines are advantageously utilized in a printer that do not have sufficient resolution in its carriage positioning mechanism, since the resolution of the sensor is relied on rather than the resolution of the carriage positioning mechanism.

Figure 11:
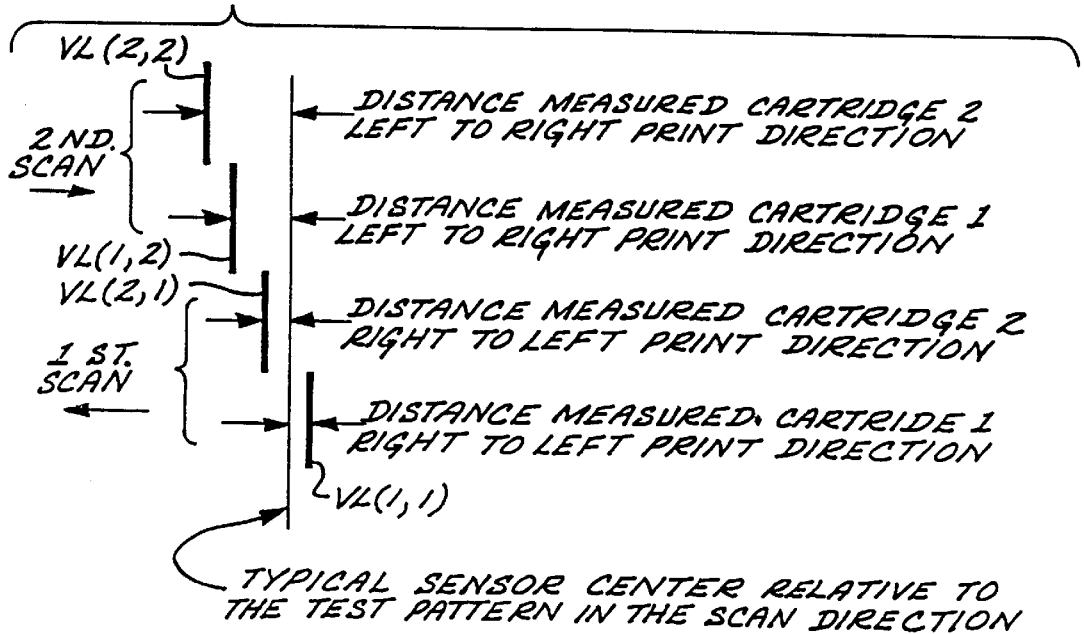
FIG. 11 illustrates in exaggerated form a plurality of vertical test line segments that can be utilized for horizontal alignment of the operation of the print cartridges of the swath printer of FIG. 1.
Figure 16A:
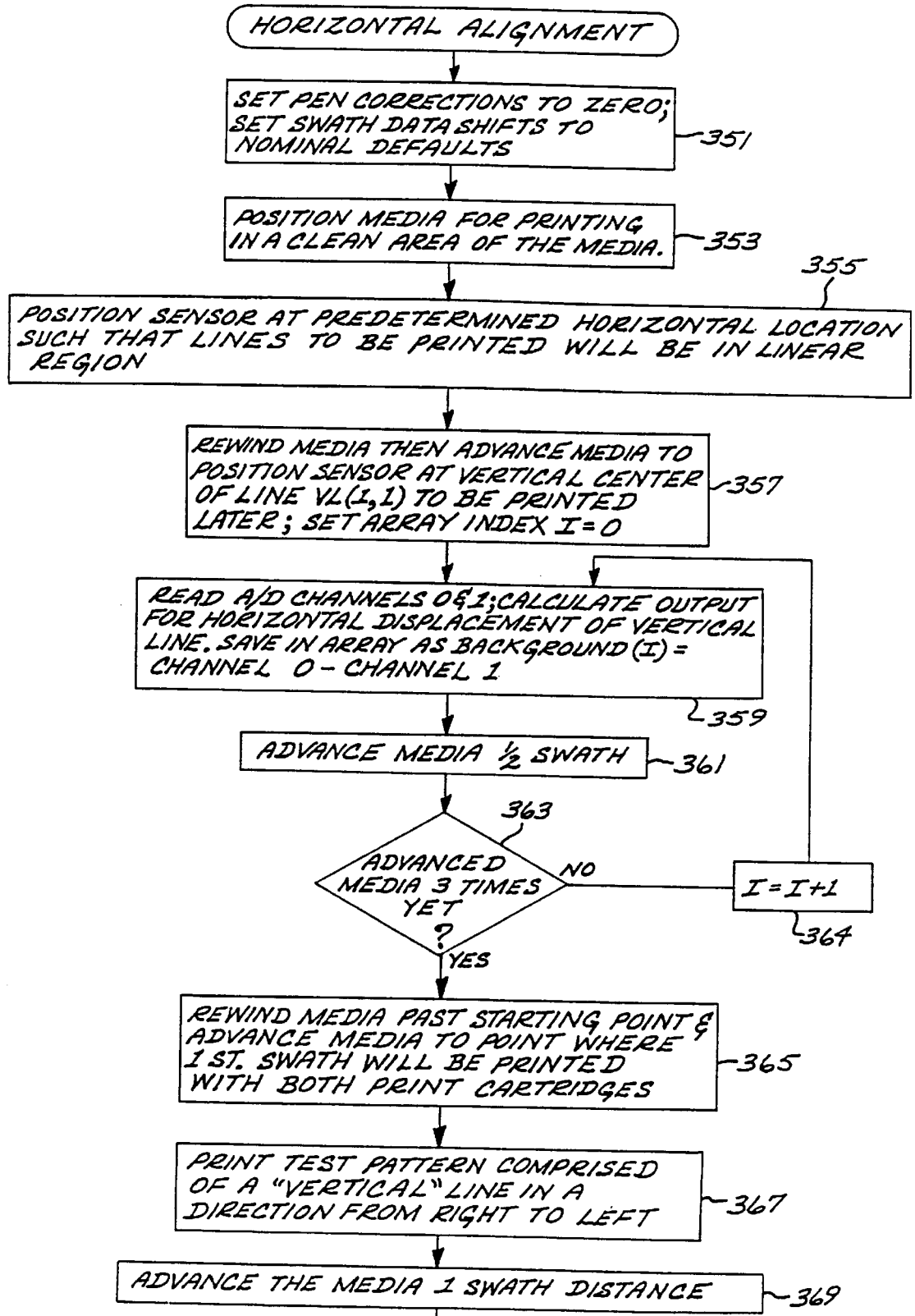
FIGS. 16A through 16C set forth a flow diagram of a procedure for horizontally aligning the operation of the print cartridges of the swath printer of FIG. 1.
Figure 16B:
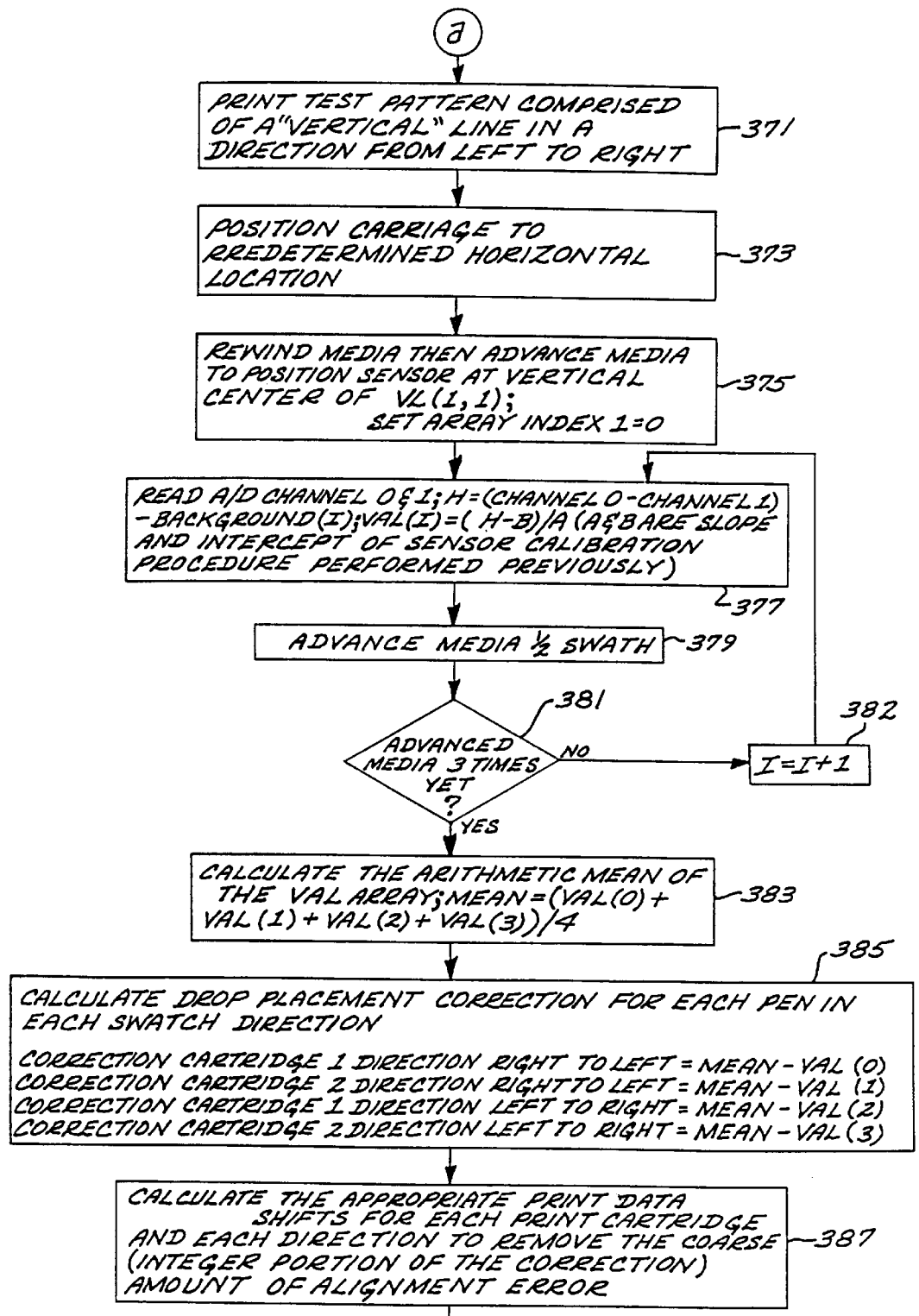
Figure 16C:
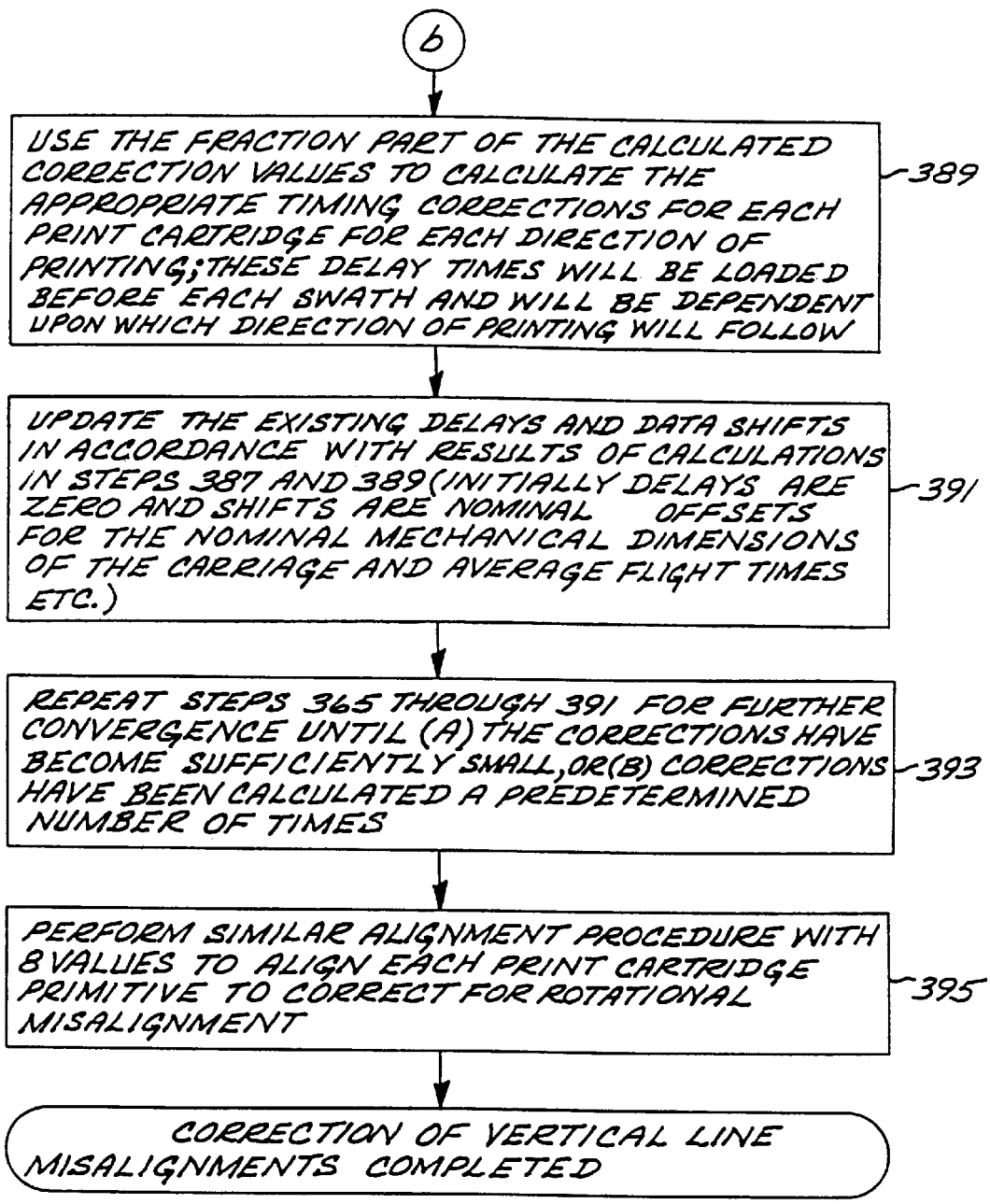
Figure 17B:
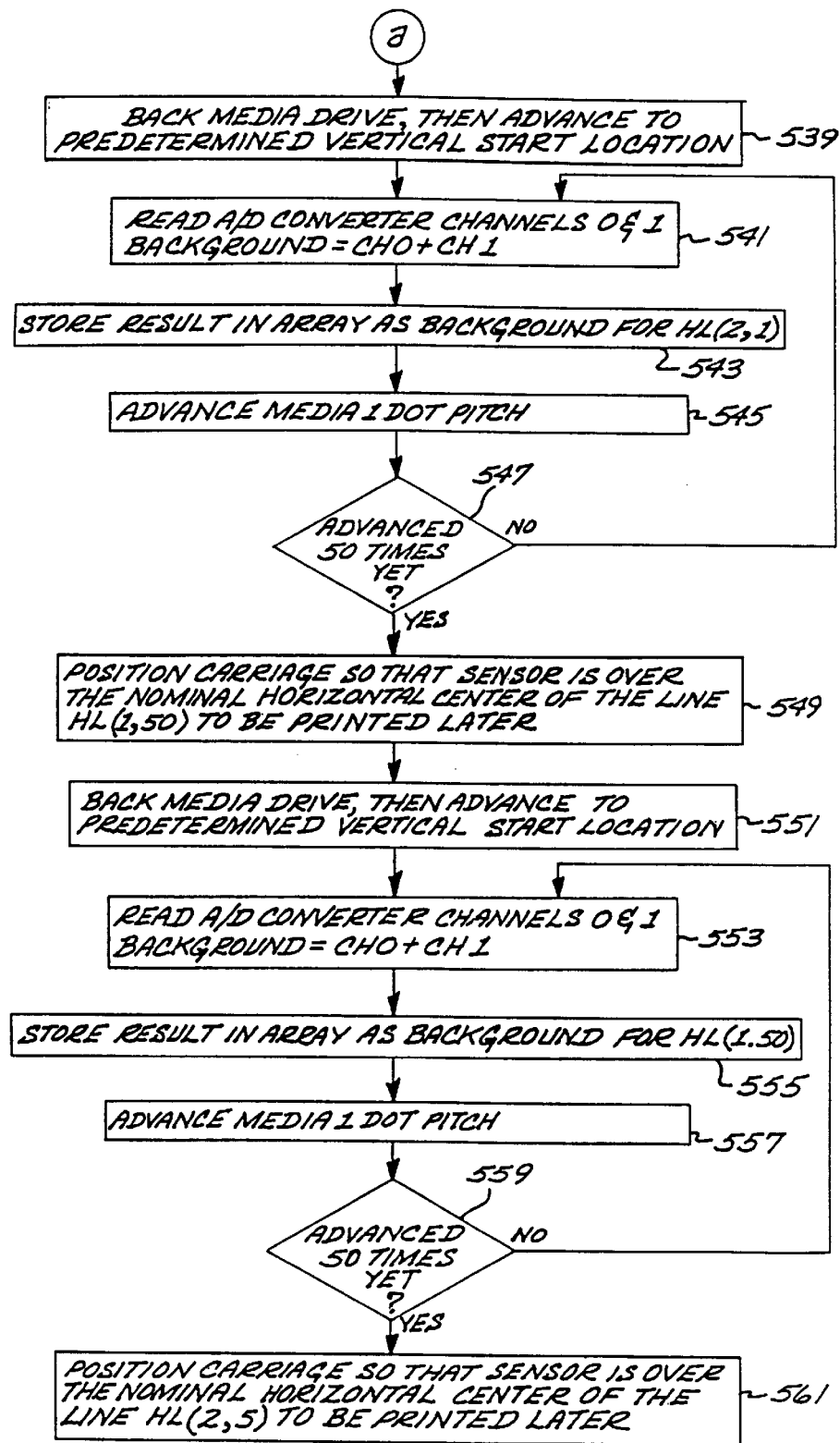
Figure 17C:
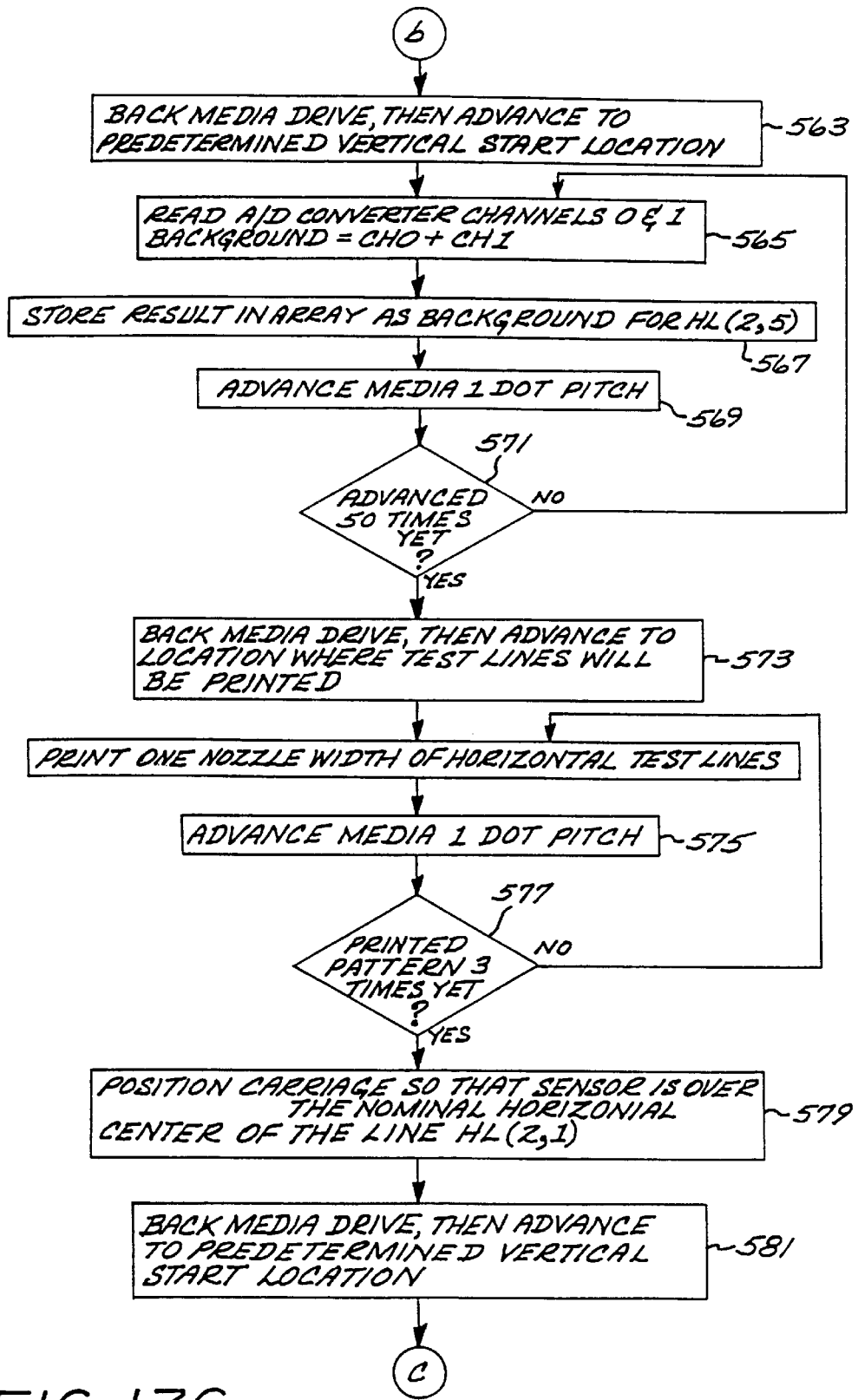
Figure 17D:
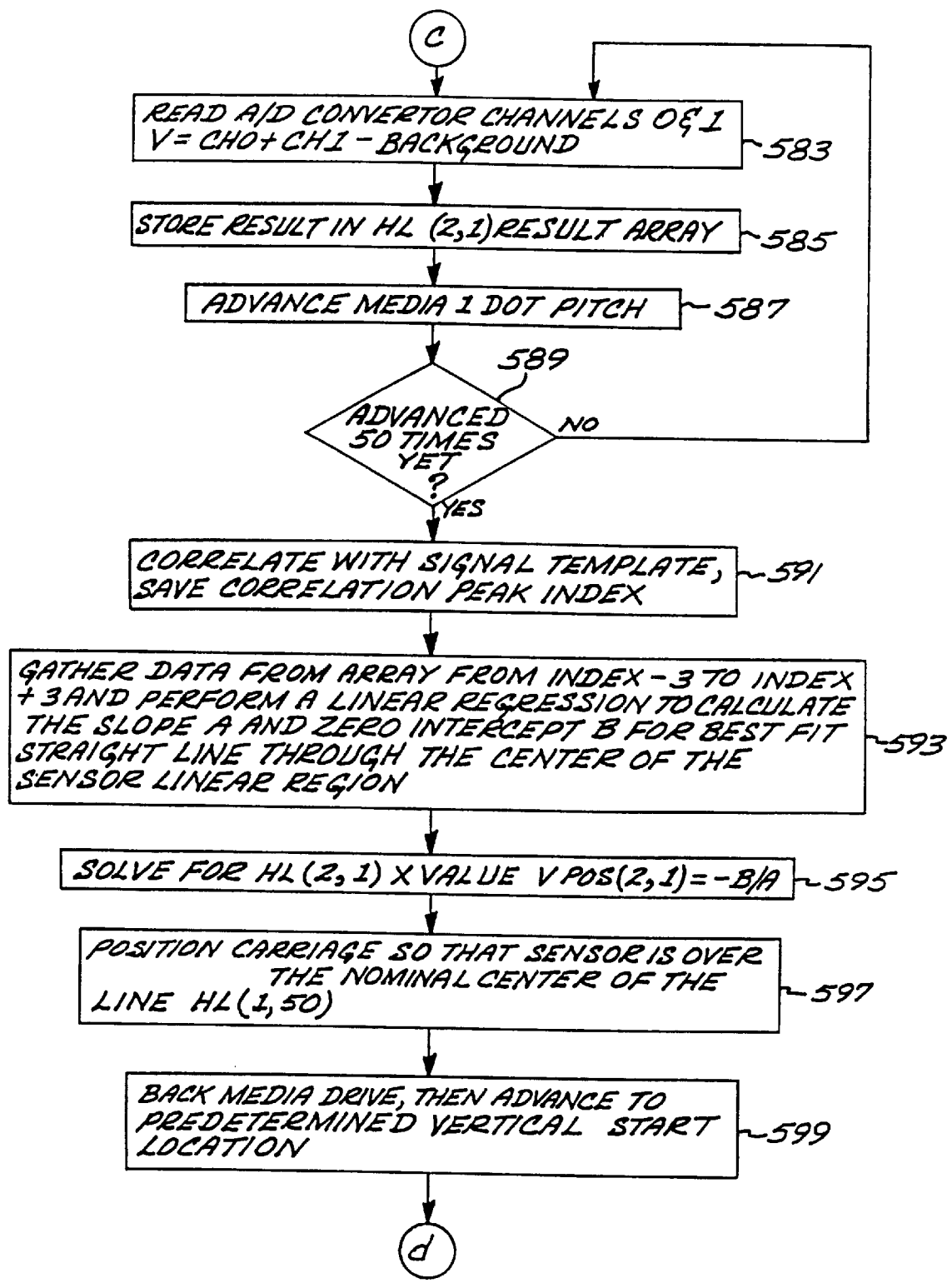
Figure 17E:
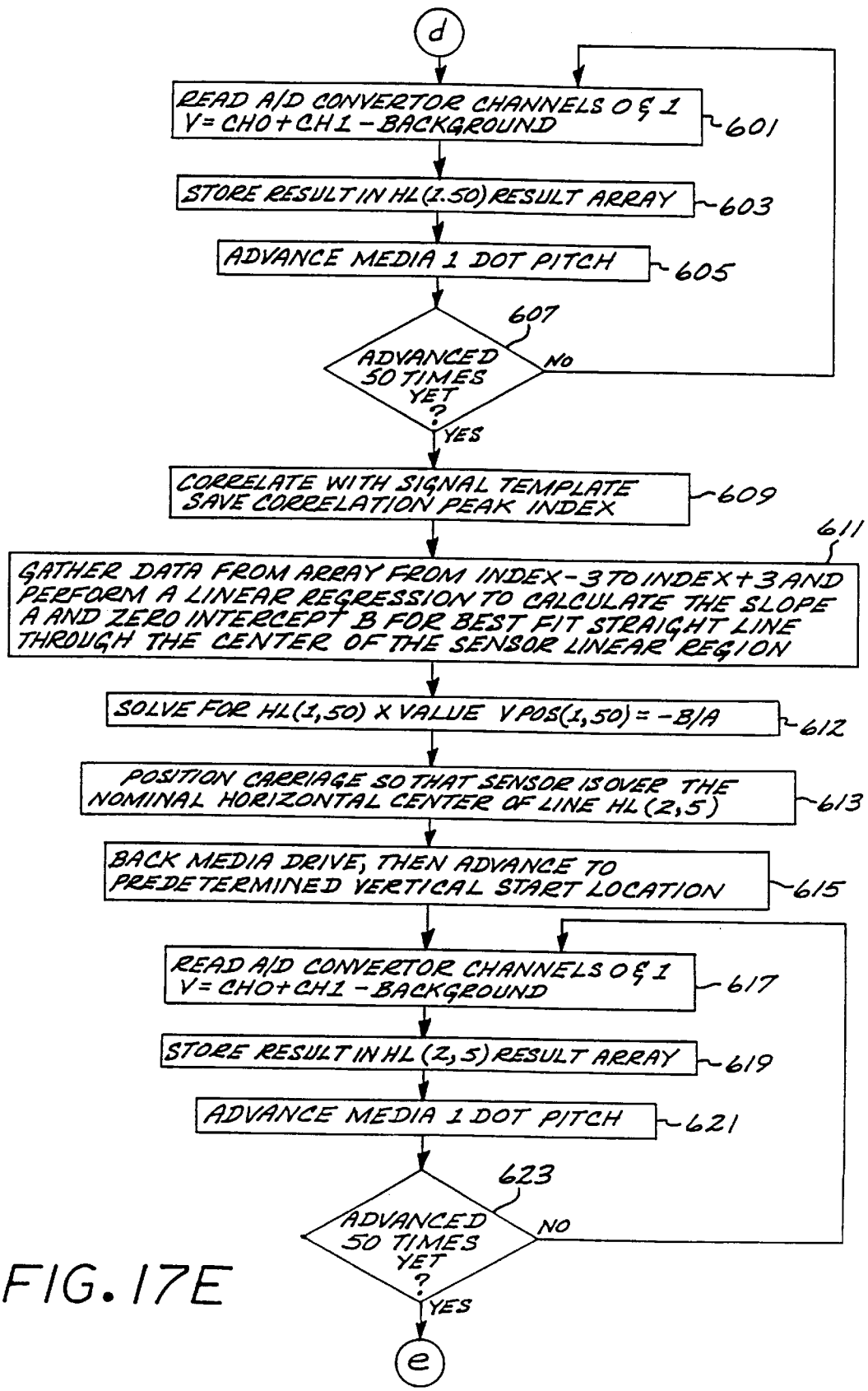
Figure 17F:
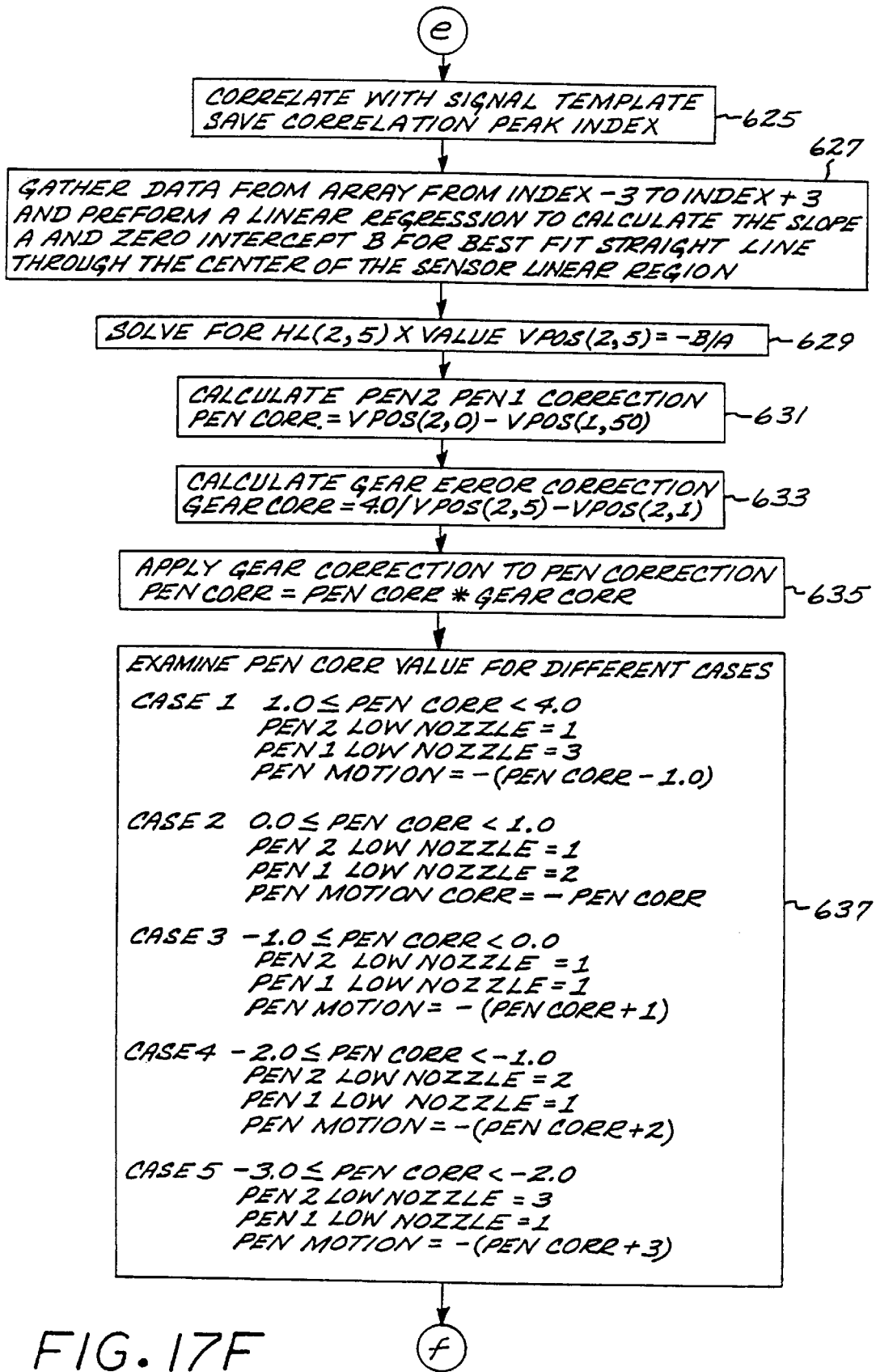
Figure 17G:
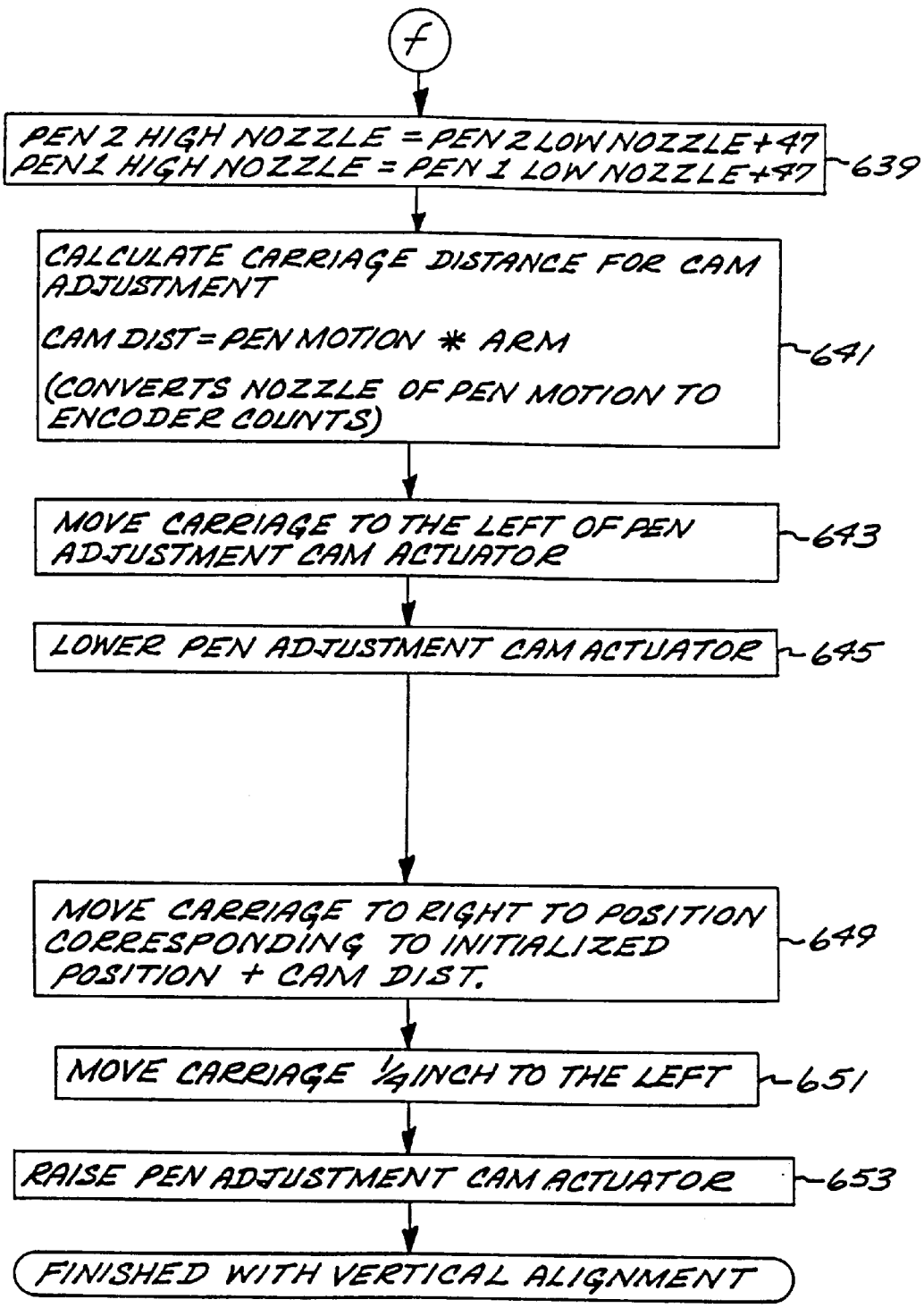

Referring now to FIGS. 16A through 16C, set forth therein is a flow diagram for providing horizontal alignment pursuant to printing vertical test line segments such as those schematically depicted in FIG. 11, determining the distances between such vertical test line segments, and utilizing the relative distance information to provide horizontal alignment corrections. At 351, timing delay corrections for the cartridges are set to zero, and swath data shifts are set to their nominal values that are based on conventionally considered factors such as nominal offsets between printhead cartridges, dimensions of the carriage, average ink drop flight times, and so forth. At 353 the media is positioned to allow printing in a clean area of the media, including for example the right margin At 355 the carriage 51 is positioned at a predetermined horizontal location that is selected so that vertical test line segments to be printed later will be in the linear region of the difference signal H response for the sensor 65 as positioned at such predetermined horizontal location. At 357 the media is rewound and then advanced to a vertically align the sensor with the location of the nominal vertical center of the line to be printed later by the cartridge C1 on the first scan (identified as the line segment VL(1,1) in FIG. 11), and an array index I is set to 0. At 359 the sensor difference signal H is read and stored in a background array as BACKGROUND (I). At 361 the media is advanced one-half swath (i.e., one nominal nozzle array height), and at 363 a determination is made as to whether the media has been advanced 3 times pursuant to 361. If no, at 364 the index I is incremented by 1, and control transfers to 359 for another background reading of the sensor difference signal H. If the determination at. 363 is yes, the media has been advanced 3 times pursuant to 361, control transfers to 365.

Pursuant to steps 353 through 363, print media background values for the difference signal H are calculated and stored for the media locations for which the sensor difference signal H will later be calculated in conjunction with determining the horizontal positions of vertical test lines printed in accordance with the following.

At 365 the media is rewound and then advanced to the vertical position where vertical line segments will be printed by both cartridges in a first swath or scan. At 367 each of the cartridges prints a 5 dot resolution pitch wide vertical line segment at the designated horizontal location, using for example 48 nozzles in each cartridge, in a first scan direction. At 369 the media is advanced one swath height, and at 371 the cartridges print a 5 dot resolution pitch wide vertical line segment at the designated horizontal location, using for example 48 nozzles in each cartridge, in second scan direction that is opposite the first scan direction.

Pursuant to steps 365 through 371, vertical test line segments are printed by each cartridge in each scan direction at a designed horizontal location. As a result of misalignments relative to the nominal mechanical specifications, the vertical test line segments are horizontally offset relative to each other, as shown in exaggerated form in FIG. 11, wherein the vertical lines VL(a,b) were printed by the $a^{th}$ cartridge in the $b^{th}$ scan or swath.

At 373, the optical sensor 65 is horizontally positioned at the predetermined horizontal location as utilized in step 355 above. At 375 the print media is rewound and then advanced to vertically align the sensor 65 with the nominal center of the first vertical line segment printed by the first cartridge C1, and the array index I is set to 0. At 377 the channel 0 and channel 1 outputs of the A/D converter 81 are read, and at 379 a background corrected value for the sensor difference signal H is calculated, and a value VAL(I) is calculated in accordance with:

$$VAL(I)=(H-B)/A \qquad \text{(Equation 4)}$$

where the values for B and A were determined pursuant to the sensor horizontal position calibration of FIGS. 15A through 15C. VAL(I) represents the horizontal position of the Ith vertical line relative to a 0 horizontal location that is common to all of the vertical lines, but need not be explicitly defined, as discussed above relative to the calibration procedure.

At 379 the media is advanced by one-half swath, and at 381 a determination of made as to whether the media has been advanced 3 times pursuant to 379. If no, at 382 the index I is incremented by 1, and control transfers to 377 for another reading of the sensor difference signal H for another vertical test line. If the determination at 381 is yes, the media has been advanced 3 times pursuant to 379, control transfers to 383.

Pursuant to steps 375 through 382, the horizontal positions of the vertical test lines are determined and stored in the array VAL(I).

At 383, the arithmetic mean of the measured horizontal positions of the vertical test lines is calculated, and at 385 the horizontal correction values for each pen in each direction is calculated by subtracting the measured horizontal position from the mean of the array of horizontal positions VAL(I). Since the horizontal positions are in units of dot resolution pitches, the correction values are also in dot resolution pitches. At 387 the integer portion of the horizontal correction values are utilized to determine swath data shift corrections for each cartridge for each scan direction that will remove the coarse amounts of alignment error. At 389 the fractional part of the horizontal correction values are utilized to calculate cartridge timing delay corrections for each printhead cartridge for each scan direction that will remove the residual alignment error remaining after coarse correction. At 391 the existing swath data shifts and cartridge timing delay corrections are updated in accordance with the correction values determined at 387 and 389. At 393 the steps 353 through 391 are repeated for further convergence until (a) the calculated corrections are sufficiently small, or (b) corrections have been calculated a predetermined number of times.

It should be appreciated that pursuant to the repetition of steps 353 through 391, the swath data shifts and cartridge timing delay corrections are repeatedly updated, with the first update being relative to nominal data shift values and timing delay corrections of zero as set pursuant to step 351, and updates being made to previously updated data shift values and firing corrections.

At 395 an alignment procedure similar to the foregoing can be executed for the situation where each printhead cartridge contains a plurality of independently controllable primitives that are essentially vertically stacked multiple nozzle printing units, wherein each unit includes a plurality of nozzles. Such alignment would correct for rotational misalignment of the cartridges, sometimes called theta-z misalignments. For the example of each printhead cartridge having two primitives, one primitive having the top 25 nozzles and the other primitive having the lower 25 nozzles, the alignment procedure would involve printing and position detecting a total of eight (8) vertical test line segments: one for each primitive for each direction. Pursuant to calculated corrections based on primitives, the data column shift values and timing delay corrections can be updated as desired, starting with the data column shifts and timing delay corrections as updated at 391 for alignment based on full cartridge vertical lines.

The swath data shifts and cartridge timing delay corrections referred to in the foregoing procedure can achieved, for example, with circuitry and techniques disclosed in the previously referenced application Ser. No. 07/786,326, for "FAST FLEXIBLE PRINTER/PLOTTER WITH THETA-Z CORRECTION," by Chen, Corrigan, and Haselby now abandoned.

While the procedure of FIGS. 16A through 16C calculates correction values at 385 based on a single set of vertical test line segments, it should be appreciated that the horizontal positions of a plurality of sets of vertical test line segments can be utilized as follows:

1. The horizontal positions VAL(I, J) for a plurality of sets of vertical test lines located at different swath locations are calculated generally in accordance with steps 351 through 383, where I is the index for a set of vertical line segments at a given swath location and is indicative of cartridge and print direction, and J is the index for the sets of test lines. For alignment based on full nozzle height vertical lines printed by the two cartridges C1 and C2, then I=0,3; and J=0,N−1, where N sets of vertical lines are being averaged.

2. The average horizontal position AVAL(I) of the vertical lines printed by each pen in each direction is calculated as follows:

AVAL(0)=[VAL(0,0)+VAL(0,1)+ . . . +VAL(0,N−1)]/N
AVAL(1)=[VAL(1,0)+VAL(1,1)+ . . . +VAL(1,N−1)]/N

AVAL(2)=[VAL(2,0)+VAL(2,1)+ . . . +VAL(2,N−1)]/N
AVAL(3)=[VAL(3,0)+VAL(3,1)+ . . . +VAL(3,N−1)]/N

3. The arithmetic MEAN of the average horizontal positions and the corrections for each pen can be calculated as in steps 383 and 385 by substitution of the average horizontal positions AVAL(I) for the non-averaged horizontal positions utilized in steps 383 and 385:

MEAN=[AVAL(0)+AVAL(1)+AVAL(2)+AVAL(3)]/4
CORRECTION C1 DIRECTION RIGHT TO LEFT= MEAN−AVAL(0)
CORRECTION C21 DIRECTION RIGHT TO LEFT= MEAN−AVAL(1)
CORRECTION C1 DIRECTION RIGHT TO LEFT= MEAN−AVAL(2)
CORRECTION C21 DIRECTION RIGHT TO LEFT= MEAN−AVAL(3)

4. The foregoing correction values can then be utilized to arrive at swath data shifts and timing delay corrections in steps 387 and 389.

Figure 12:
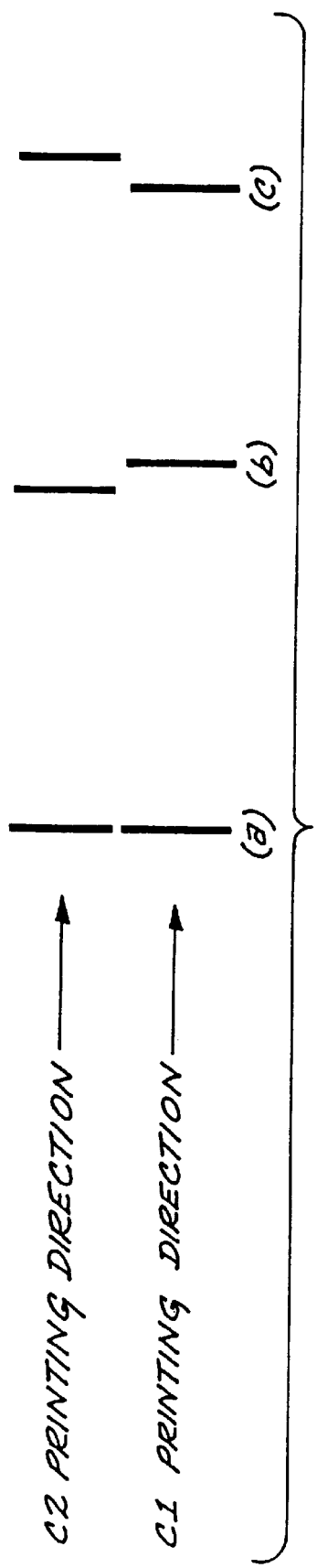
FIG. 12 illustrates in exaggerated form a plurality of vertical test line segments that can be utilized for horizontal alignment of the operation of the print cartridges of the swath printer of FIG. 1 for unidirectional printing.

While the foregoing horizontal alignment procedure is directed to horizontal alignment for bidirectional printing with both cartridges, horizontal alignment for unidirectional printing by both cartridges can be achieved with procedures similar to those set forth in FIGS. 15A through 15C and FIGS. 16A through 16C. After calibration of the optical sensor 65, background values for the test area are determined, vertical test lines at a test swath position are printed by both cartridges in the scan direction for which alignment is being sought, and the horizontal positions of the test lines relative to each other are determined to arrive at swath data shift and/or timing delay corrections. The test pattern produced would be one of three possible test patterns as represented by three pairs of vertical lines (a), (b), (c) in FIG. 12. The vertical lines (a) would be printed if the horizontal alignment between the printhead cartridges was proper. The vertical lines (b) would result if the print cartridge C2 lags the print cartridge C1 (or the print cartridge C1 leads the print cartridge C2). The vertical lines (c) would result if the print cartridge C1 lags the print cartridge C2 (or the print cartridge C2 leads the print cartridge C1). The relative positions of the two vertical test line segments would be utilized to provide swath data shift corrections and cartridge timing delay corrections.

Figure 13:
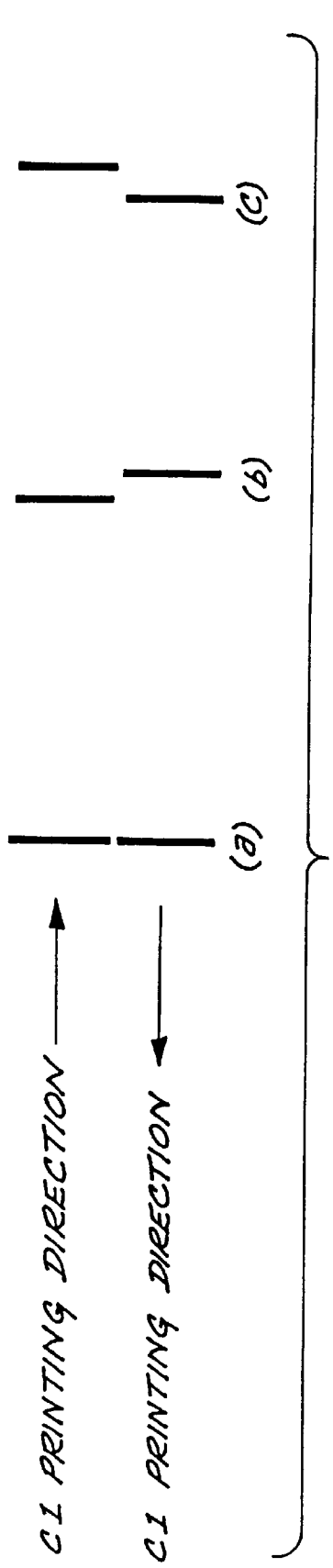
FIG. 13 illustrates in exaggerated form a plurality of vertical test line segments that can be utilized for horizontal alignment of the operation of the print cartridges of the swath printer of FIG. 1 for bidirectional printing with a single cartridge.

It would also be possible to provide for horizontal alignment for bidirectional printing by one print cartridge with procedures similar to those set forth in FIGS. 15A through 15C and FIGS. 16A through 16C. After sensor calibration, background values for the test area are determined, first and second vertical test lines at a selected swath location are printed in each of the carriage scan directions by the cartridge being aligned, and the horizontal positions of the vertical lines relative to each other are determined to arrive at data shift and/or timing delay corrections. The test pattern produced would be one of three possible test patterns as represented three pairs of vertical lines (a), (b), (c) in FIG. 13. The vertical lines (a) indicate that the spacing between the print cartridge and the print media is proper; the vertical segments (b) indicate that the spacing between the print cartridge and the print media is too small; and the vertical segments (c) indicate that the spacing between the print cartridge and the print media is too large. If the spacing is not proper, appropriate swath data shifts and/or cartridge delay corrections can be provided for one or both of the carriage scan directions.

Figure 14:
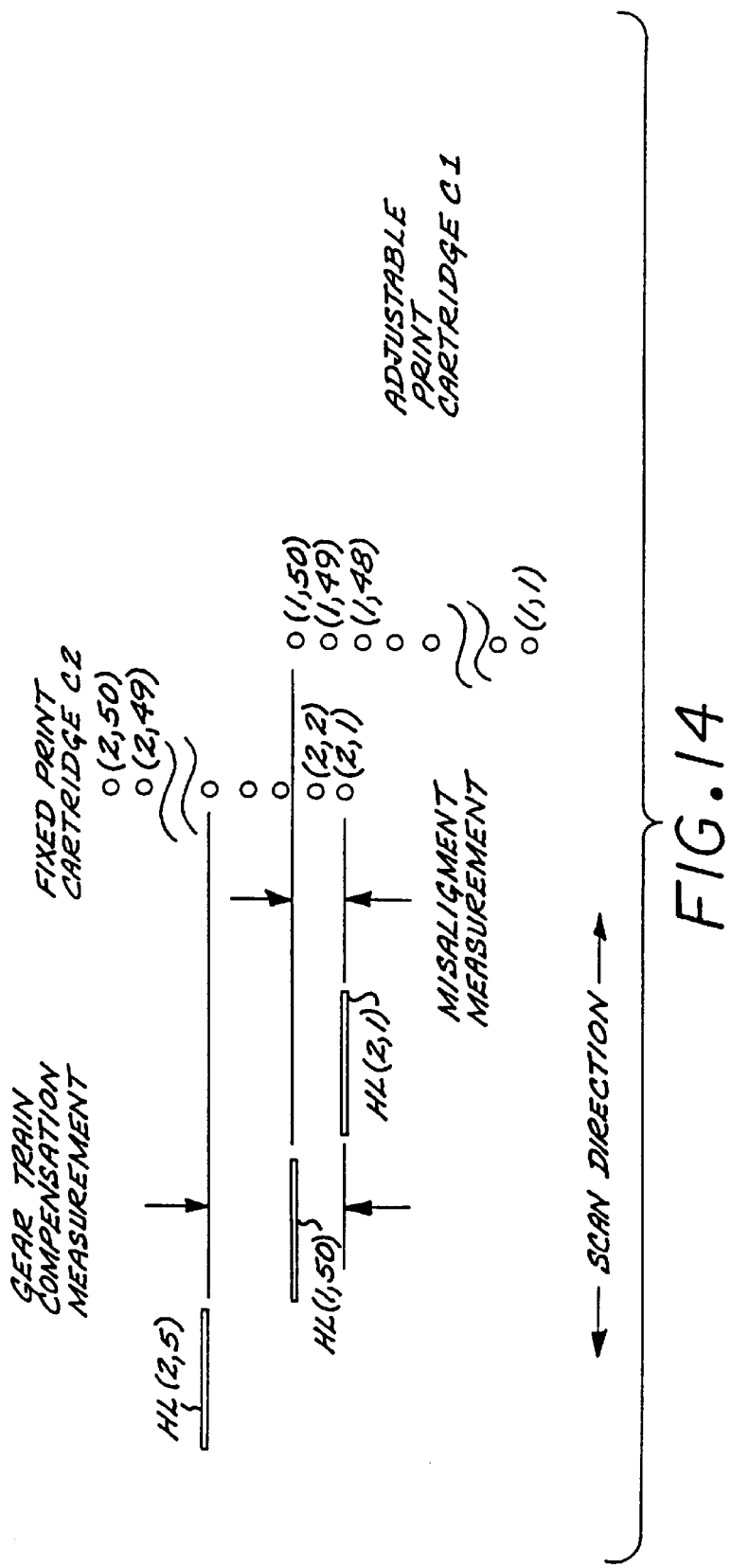
FIG. 14 illustrates in exaggerated form a series of horizontal test line segments that can be utilized for vertical alignment of the print cartridges of the swath printer of FIG. 1.

Vertical alignment can generally be achieved by printing a plurality of non-overlapping horizontal test lines with at least one nozzle of each of the printhead cartridges, utilizing the optical sensor 65 to precisely detect the vertical positions of the plurality of non-overlapping horizontal test line segments relative to a fixed reference, and processing the relative positions to arrive at an adjustment for the position of the first printhead cartridge C1. FIG. 14 sets forth by way of illustrative example horizontal test line segments HL(1, 50), HL(2,1), HL(2,5), which are respectively printed by nozzle 50 of the first print cartridge, the nozzle 1 of the second print cartridge, and the nozzle 5 of the second cartridge; and FIGS. 17A through 17G set forth a flow diagram of a procedure for achieving vertical alignment pursuant to printing and detecting the relative positions of such lines. It should be appreciated that the horizontal line segments are identified in the form of HL(c,d) where c identifies the cartridge number and cl identifies the nozzle. Pursuant to the flow diagram of FIGS. 17A through 17G, the adjustment cam 111 is rotated to a known position, background values for the sensor difference signal V are calculated for locations on the print media where the sensor will be positioned for detecting the positions of horizontal test line segments to be printed later, the horizontal test line segments are printed, and the positions of the horizontal test line segments are determined by incrementally moving the print media relative to a fixed start position and calculating a value for the sensor difference signal V at each incremental position.

Referring in particular to FIGS. 17A through 17G, at 511 the carriage is moved so that the cam lever 117 is to the right of the cam actuator arm 121 which is in the raised position, and at 513 the cam actuator arm 121 is lowered. At 515 the carriage 51 is moved to the left so that the cam lever 117 is engaged by the cam actuator arm 121 and rotated against the right cam stop 119. At 517 the carriage 51 is moved to the right by one-quarter inch to disengage the cam actuator arm 121 from the cam lever 117, and at 519 the cam actuator arm 121 is raised. At 521 the carriage 51 is moved to the left so that the cam lever 117 is to the left of the actuator arm 121, and at 523 the actuator arm 121 is lowered. At 525 the carriage 51 is moved to the right to remove linkage backlash, and to move the cam lever 117 from the cam stop 19 to a known initial position relative to the carriage 51. At 527 the carriage 51 is moved to the left by one-quarter inch to disengage the cam lever 117 from the cam actuator arm 121, and at 529 the cam actuator arm 121 is raised.

Pursuant to steps 511 through 525, the cam lever 117 is set to an initial known position with respect to the carriage 51. The carriage position along the carriage scan axis after moving the cam lever 117 to the initial known position is saved as a carriage reference position for later use to advance the cam lever further away from the right cam stop 119 (i.e., counterclockwise as viewed from above), as described further herein. Generally, the final carriage position corresponding to the final adjusted cam lever position will be based on the saved carriage reference position and a calculated additional carriage displacement necessary to move the cam lever 117 to its final adjusted position. Thus, for the final adjustment, the cam actuator arm 121 will be raised and the carriage 51 will be positioned so that the cam lever is to the left of the actuator arm 121. The cam actuator arm 121 would then be lowered, and the carriage 51 would be moved to the right to the final carriage position for cam adjustment, so as to move the cam lever 117 in a counterclockwise direction, as viewed from above, from the initial known position.

At 537 the carriage is positioned so that the optical sensor 65 is positioned over the location on the print media 61 of the nominal horizontal center of the horizontal line HL(2,1) line to be printed later. At 539 the print media 61 is rewound past a predetermined start location that will be used for all sensor detection operations, and is then advanced to the predetermined start location so as to remove backlash in the media drive gear train. The predetermined start location is selected so that all of the horizontal test lines will be close to the center of a vertical scan of 50 resolution dot pitches, for example. At 541 the channel 0 and channel 1 outputs of the A/D converter 81 are read, and a value of the background value of the difference signal V is calculated pursuant to Equation 2 for the particular vertical position of the print media 81. At 543 the background value for the present vertical location is stored in an array for the horizontal line HL(2,1), and at 545 the print media 61 is advanced by one resolution dot pitch. At 547 a determination is made as to whether the media 61 has been advanced 50 resolution dot pitches since the media was positioned at the predetermined start location in step 537. If no, control returns to 541 for calculation of further media background values of the sensor difference signal V. If the determination at 547 is yes, the media 61 has been advanced 50 times, the process continues to step 549.

Pursuant to steps 537 through 547, background values of the sensor difference signal V are calculated for each of the positions on the media for which values of the sensor difference signal V will be calculated in conjunction with determining the position of the horizontal line HL(2,1) to be printed later. The background values will later be subtracted from the values of the sensor difference signal V calculated for the same locations for determining the position of the horizontal line HL(2,1) after such line has been printed.

Steps 549 through 559 are similar to steps 537 through 547, and are performed to obtain media background values of the sensor difference signal V for the media positions for which values of the sensor difference signal V will be calculated in conjunction with determining the position of the horizontal line HL(1,50).

Steps 561 through 571 are also similar to steps 537 through 547, and are performed to obtain media background values of the sensor difference signal V for the media positions for which values of the sensor difference signal V will be calculated in conjunction with determining the position of the horizontal line HL(2,5).

At 572 the media drive is backed and then advanced to the location where the test lines are to be printed. At. 573 one nozzle wide horizontal lines corresponding to the test lines are printed by the nozzles (2,5), (1,50), and. (2,1) in one scan, and at 575 the print media is advanced by one resolution dot pitch. At 577 a determination is made as to whether the one nozzle wide test lines have been printed three times. If no, control returns to 573 to print further one nozzle wide test lines at the same horizontal locations. If the determination at 577 is yes, the one nozzle wide test lines have been printed three times, control transfers to 353. Essentially, the steps 573 through 577 causes the printing of horizontal test lines which are three nozzles wide as measured in the media scan direction, which provides for a larger optical sensor output.

At 579 the carriage is positioned so that the optical sensor 65 is positioned over the location of the nominal horizontal center of the horizontal test line segment HL(2,1). At 581 the print media 61 is rewound past the predetermined start location utilized for all sensor detection operations, and is then advanced to the predetermined start location so as to remove backlash in the media drive gear train. At 583 the channel 0 and channel 1 outputs of the A/D converter 81 are read, and a background corrected value for the difference signal V is calculated. At 585 the background corrected difference value for the present vertical media location is stored in the result array for the horizontal line HL(2,1), and at 587 the print media 61 is advanced by one resolution dot pitch. At 589 a determination is made as to whether the media 61 has been advanced 50 resolution dot pitches since the media was positioned at the predetermined start location in step 579. If not, control returns to 583 for calculations of further values of the sensor difference signal V.

If the determination at 589 is yes, the media has been advanced 50 times, at 591 the background corrected difference signal V data is correlated with a signal template that resembles the useful center portion of an ideal curve of the difference signal V. The template function has fewer data points than the stored array of background corrected values of the vertical difference signal V, and the array position of the vertical difference signal value at the center of the sequence of background corrected difference signal values that produces the maximum correlation is saved as the maximum correlation index. At 593 the background corrected value of the vertical difference signal V corresponding to the maximum correlation index and the three background corrected values of the difference signal V on either side thereof are utilized for a linear regression that determines the best fit straight line:

$$V = A * VPOS + B \qquad \text{(Equation 5)}$$

where V is the background corrected vertical difference signal V calculated at step 583, VPOS is vertical line position relative to predetermined vertical start location, A is the slope, B is the hypothetical value of V according to the best fit line for a horizontal line located at the predetermined vertical start location. At 595 the vertical position for the line HL(2,1) relative to the predetermined vertical start location is set equal to $-B/A$, which follows from setting V equal to zero in Equation 5 above.

Pursuant to steps 579 through 595, values of the sensor vertical difference signal V are determined for locations spaced one resolution dot pitch apart over a vertical range that extends above and below the horizontal test line segment HL(2,1) in order to calculate a vertical position for the line relative to the predetermined vertical start location.

Steps 597 through 612 are performed to determine the vertical position of the line HL(1,50) relative to the predetermined vertical start location, and are similar to steps 579 through 595.

Steps 613 through 629 are performed to determine the vertical position of the line HL(2,5) relative to the predetermined vertical start location, and are also similar to steps 579 through 595.

At 631 a pen correction value PEN CORR is calculated by subtracting V(1,50) from V(2,0), and at 633 a gear train correction value GEAR CORR is calculated by dividing the nominal distance between the nozzles (2,5) and (2,1) (i.e., 4 dot pitches) by the calculated distance between such nozzles. At 635 the pen correction value PEN CORR calculated at 631 is multiplied by the gear correction value GEAR CORR to arrive at a final pen correction value PEN CORR. From the calculations for the final pen correction value PEN CORR, it should be appreciated that a positive value of PEN CORR indicates no overlap between the cartridge C1 nozzles and the cartridge C2 nozzles, while a negative value of PEN CORR indicates overlap.

The gear train correction value GEAR CORR corrects for cyclical gear errors in the media drive mechanism that could result in a slightly different gear ratio in the region of the horizontal test lines that are being measured. It is a second order effect but can be normalized using the measurement procedure described above so as to reference the misalignment distance (which is between the horizontal lines HL(2,1) and HL(1,50)) to the measured gear compensation distance (which is between HL(2,1) and HL(2,5)), rather than referencing the misalignment distance to an absolute rotation of the media drive motor encoder.

At 637, the lowermost enabled nozzles for the cartridges C1, C2 and a PEN MOTION value are determined by comparing the final pen correction value PEN CORR with certain empirically determined limits.

If PEN CORR is greater than or equal to 1.0 and less than 4.0, Case 1 applies: low nozzle for cartridge 2 is (2,1), low nozzle for cartridge C1 is (1,3), and PEN MOTION is equal to −(PEN CORR−1).

If PEN CORR is greater than or equal to 0.0 and less than 1.0, Case 2 applies: low nozzle for cartridge 2 is (2,1), low nozzle for cartridge C1 is (1,2), and PEN MOTION is equal to −PEN CORR.

If PEN CORR is greater than or equal to −1.0 and less than 0.0, Case 3 applies: low nozzle for cartridge 2 is (2,1), low nozzle for cartridge C1 is (1,1), and PEN MOTION is equal to −(PEN CORR+1).

If PEN CORR is greater than or equal to −2.0 and less than −1.0, Case 4 applies: low nozzle for cartridge 2 is (2,2), low nozzle for cartridge C1 is (1,1), and PEN MOTION is equal to −(PEN CORR+2).

If PEN CORR is greater than or equal to −3.0 and less than −2.0, Case 5 applies: low nozzle for cartridge 2 is (2,3), low nozzle for cartridge C1 is (1,1), and PEN MOTION is equal to −(PEN CORR+3).

Pursuant to Cases 2 through 5 in step 637, appropriate sets of nozzles are selected for the printhead cartridges such that the vertical distance between the uppermost enabled nozzle of the cartridge C1 and the lowermost enabled nozzle of cartridge C2 is greater than or equal to 1 nozzle pitch but less than 2 nozzle pitches. This effectively implements the integer portion of the calculated correction. The fractional part of the calculated correction will be implemented by adjusting the position of the cartridge C1 so that the vertical distance between the uppermost enabled nozzle of the cartridge C1 and the lowermost enabled nozzle of cartridge C2 is substantially one nozzle pitch. Thus, as to Cases 2 through 5, the cam adjustment will be less than one nozzle pitch. Effectively, if there is overlap or if there is not overlap and the vertical distance between the top nozzle of the cartridge C1 and the bottom nozzle of the cartridge C2 is less than one nozzle pitch, nozzle selection is utilized in such that the vertical distance between the uppermost enabled nozzle of the cartridge C1 and the lowermost enabled nozzle of cartridge C2 is greater than or equal to 1 nozzle pitch but less than 2 nozzle pitches. Cam adjustment provides for the residual correction.

Case 1 is a special case where the nozzles of the cartridges C1, C2 do not overlap along the vertical direction with the cam in the reference position, and the cam adjustment must be greater than one nozzle pitch.

By way of illustrative example, a nominal nozzle overlap between cartridges of about 1 to 2 nozzle pitches and a total cam actuated mechanical adjustment range for the print cartridge C1 of about 2½ nozzle pitches provide for a total adjustment range of about ±4 nozzle pitches to correct for print cartridge manufacturing tolerances, retaining shoe manufacturing tolerances, and cartridge insertion tolerances.

The total equivalent adjustment of the printhead cartridge C1 to the cartridge C2 is thus achieved by (a) selecting the appropriate series of nozzles for use and (b) mechanically moving the print cartridge C1 to remove any misalignment remaining after nozzle selection. Only Case 1 of step 637 requires moving the print cartridge C1 more than one nozzle pitch toward the print cartridge C1, since Case 1 is for the situation where the cartridges are too far apart along the media scan axis and correction by nozzle selection is not possible.

For the arrangement shown in FIG. 14, Case 4 would apply since the PEN CORR for the lines HL(2,1) and HL(1,50) as shown would be greater than −2.0 and less than −1.0 resolution dot pitches. PEN CORR would be a positive fraction less than 1.0, which means that nozzle (1,48) will be brought closer to nozzle (2,2) along the media scan axis.

At 639 the high nozzles for each cartridge are determined by adding 47 to the low nozzle numbers, and at 641 the carriage travel distance CAM DIST in linear encoder counts for cam adjustment is calculated by multiplying PEN MOTION by ARM CONSTANT, where ARM CONSTANT is a constant that converts PEN MOTION, which is the number of nozzle pitches that cartridge C1 is to be brought closer along the media scan axis to the cartridge C1, to carriage displacement required to move the cam lever 117 with the cam actuator arm 121. ARM CONSTANT can be determined analytically or empirically, and the linear relation between CAM DIST and PEN MOTION is based on the cam 111 being designed so that an essentially linear relation exists between (a) carriage motion while moving the cam arm and (b) effective nozzle displacement along the media scan axis.

Alternatively, CAM DIST can be non-linearly related to PEN MOTION, and such relation can be derived analytically or empirically. Empirical data can be produced, for example, by incrementally positioning the cam pursuant by moving the carriage to known locations spaced by a predetermined number of encoder counts and measuring the resulting values of PEN CORR at each of the carriage locations. Pursuant to the empirical data, a function or look-up table scheme can be produced to relate cam moving carriage motion to change in nozzle distance.

At 643, with the cam actuator in the raised position, the carriage is moved to the left side thereof. At 645 the cam actuator arm is lowered, and at 649 the carriage is moved to the right to a position equal to the carriage reference position saved previously at step 525 and the CAM DIST value calculated above in step 641. This in effect moves the cam an amount corresponding to the carriage movement of CAM DIST, since in absolute scan axis encoder position the cam was left at the reference position saved at step 525. At 651 the carriage is moved left by ¼ of an inch so as to clear the cam arm from the cam adjustment actuator, and at 653 the cam adjustment actuator arm is raised. The vertical axis or media axis alignment procedure is then completed.

In the foregoing procedure for vertical alignment, the logically enabled nozzles are selected to correct the calculated misalignment to the closest integral nozzle pitch, except for Case 1 in step 637, and any remaining fractional dot pitch correction, as well as the correction for Case 1, is made in a fixed direction by physical carriage dimensional adjustment. It is also contemplated that the vertical alignment can be achieved by using only selection of logically enabled nozzles, for example in a swath printer having a sufficiently high resolution so that the residual fractional dot pitch errors do not produce objectionable print quality, and further having mechanical tolerances that assure overlapping or non-overlap with the vertical distance between the top nozzle (1,1) of the cartridge C1 and the bottom nozzle (2,50) of the cartridge C2 being less than one nozzle pitch. The enabled nozzles would then be selected as desired so that the enabled nozzles are non-overlapping, for example on the basis of print quality, achieving a remaining error of less than one nozzle pitch, or achieving a vertical distance between the top enabled nozzle of the cartridge C1 and the bottom enabled nozzle of the cartridge C2 that closest to one nozzle pitch, even if the resulting vertical distance is greater than one nozzle pitch.

While the foregoing disclosure sets forth one procedure for detecting relative positions of horizontal test line segments and another procedure for detecting relative positions of vertical test line segments, it should be appreciated that the procedure for horizontal test lines can be adapted for vertical test lines, and the procedure for vertical test lines can be adapted to horizontal test lines, depending upon the resolution and accuracy of the carriage positioning and media positioning mechanisms with which the procedures are implemented. It should also be appreciated as to detecting the positions of horizontal and vertical test lines that other types of sensors could be utilized, including for example charge coupled device (CCD) arrays. As a further alternative one dual detector could be utilized for detecting the positions of horizontal lines, and another dual detector could be utilized for detecting vertical lines.

While the disclosed apparatus and techniques for alignment of print element arrays have been discussed in the context of an ink jet printer having two printheads, the disclosed apparatus and techniques can be implemented with ink jet printers which have more than two printheads or nozzle arrays arranged to increase swath height, and also with other types of raster type printers such as pin type impact printers. Further, the horizontal alignment techniques can be implemented to correct for bidirectional printing errors of a single print element array printer such as a single cartridge ink jet printer.

The foregoing has been a disclosure of apparatus and techniques for efficiently and reliably achieving alignment of the printhead cartridges of a multiple printhead swath printer, which provides for improved continuous graphics throughput with high print quality. The disclosed apparatus and techniques in particular provide for high print quality with bidirectional printing with a multiple printhead ink jet printer. The disclosed apparatus and techniques advantageously avoid extremely tight mechanical tolerances, compensate for processing variations as well as voltage and temperature effects of electrical components, and compensate for print cartridge mounting errors that result from insertion of the cartridges into the cartridge retaining shoes which cannot be corrected by manufacturing tolerance control.

Although the foregoing has been a description and illustration of specific embodiments of the invention, various modifications and changes thereto can be made by persons skilled in the art without departing from the scope and spirit of the invention as defined by the following claims.

What is claimed is:

1. A swath type printing system comprising:
   a print carriage movable along a carriage scan axis over a print zone;
   a motor for moving print media through said print zone along a media scan axis that is substantially orthogonal to said carriage scan axis;
   a plurality of print cartridges supported by said print carriage and having ink firing nozzles spaced apart a predetermined nozzle pitch distance from each other to print rows of dots in a single scan of said print carriage;
   a controller coupled to said print cartridges for sending activation signals to selected ink firing nozzles to print on said media a first test line segment from one of said print cartridges and a second test line segment from another of said print cartridges, with said first test line segment spaced apart from said second test line segment; and
   optical sensing means carried by said print carriage and configured to detect the relative positions of said first test line segment and said second test line segment in order to cause appropriate data to arrive at said ink firing nozzles when said nozzles are over a appropriate location of said media.

2. The printing system of claim 1 wherein said first and second test line segments constitute horizontal line segments which serve as a basis for determining print cartridge misalignment along said media scan axis.

3. The printing system of claim 1 wherein said first and second test line segments constitute vertical line segments which serve as a basis for determining print cartridge misalignment along said carriage scan axis.

4. The printing system of claim 1 wherein said first and second test line segments serve as a basis for determining rotational misalignment of said print cartridges.

5. The printing system of claim 1 wherein said first test line segment and said second test line segment are both printed by moving said carriage in a same first direction along said carriage scan axis.

6. The printing system of claim 5 which includes a bi-directional printing system wherein a third test line segment and a fourth test line segment are both printed by moving said carriage in a same second direction opposite to said first direction along said carriage scan axis.

7. The printing system of claim 1 wherein said optical sensor generates an encoded signal based on said relative positions of said first test line segment and said second test line segment; and further including
   a signal processor in communication with said optrical sensor to receive said encoded signal and generate an alignment correction.

8. The printing system of claim 7 wherein said signal processor generates an alignment correction for some of said firing nozzles of one or more units of said predetermined nozzle pitch distance.

9. The printing system of claim 7 wherein said signal processor generates an alignment correction for some of said firing nozzles of a fractional part of said predetermined nozzle pitch distance.

10. A swath printing system for calibrating and correcting alignment differences between a plurality of nozzle groups mounted on a carriage for printing on a pixel grid comprising:
    a first group of ink ejection nozzles;
    a second group of ink ejection nozzles different from said first group;
    a carriage for mounting said first group and second group of nozzles;
    a controller coupled to said ink ejection nozzles for printing a first calibration segment from said first group and a second calibration segment from said second group;
    an optical sensor positioned over the pixel grid to detect the relative positions of said first calibration segment and said second calibration segment and generate an encoded signal based on said relative positions; and
    a signal processor in communication with said optical sensor to receive said encoded signal and generate a correction in order to cause appropriate data signals to activate said ink ejection nozzles at an appropriate location on the pixel grid.

11. The printing system of claim 10 wherein said first group of nozzles is located on a first print cartridge, and said second group of nozzles is located on a second print cartridge.

12. The printing system of claim 11 wherein said first calibration segment and said second calibration segment are spaced apart horizontal line segments, and said signal processor generates a correction of vertical misalignment between said first print cartridge and said second print cartridge.

13. The printing system of claim 11 wherein said first calibration segment and said second calibration segment are spaced apart vertical line segments, and said signal processor generates a correction of horizontal misalignment between said first print cartridge and said second print cartridge.

14. The printing system of claim 10 wherein said first group of nozzles constitutes one primitive on a print cartridge, and said second group of nozzles constitutes a second primitive on the same print cartridge.

15. The printing system of claim 14 wherein said signal processor generates a correction of rotational misalignment for said same print cartridge.

* * * * *